United States Patent [19]

Seward et al.

[11] Patent Number: 6,140,752
[45] Date of Patent: Oct. 31, 2000

[54] ENERGY STORAGE DEVICE HAVING A PLURALITY OF SINGLE CHARGED PARTICLES AND A CHARGE NEUTRALIZER

[75] Inventors: D. Clint Seward, Acton; Chiping Chen, Needham; Richard J. Temkin, Newton Centre, all of Mass.

[73] Assignee: Electron Power Systems, Acton, Mass.

[21] Appl. No.: 08/973,138

[22] PCT Filed: May 31, 1996

[86] PCT No.: PCT/US96/08175

§ 371 Date: Mar. 12, 1998

§ 102(e) Date: Mar. 12, 1998

[87] PCT Pub. No.: WO96/38848

PCT Pub. Date: Dec. 5, 1996

Related U.S. Application Data

[63] Continuation-in-part of application No. 08/455,221, May 31, 1995, Pat. No. 5,773,919, which is a continuation-in-part of application No. 08/455,077, May 31, 1995, which is a continuation-in-part of application No. 07/996,752, Dec. 24, 1992, Pat. No. 5,589,727.

[51] Int. Cl.[7] .............. H01J 17/26; H01J 61/28; H05H 13/00; H05H 11/00

[52] U.S. Cl. ............ 313/231.31; 313/62; 315/502; 315/504

[58] Field of Search .................. 313/62, 231.31, 313/359.1; 315/500, 501, 502, 503, 504

[56] References Cited

U.S. PATENT DOCUMENTS

| | | | |
|---|---|---|---|
| 2,233,779 | 3/1941 | Fritz | 250/36 |
| 2,993,851 | 7/1961 | Thomson et al. | 204/193.2 |
| 3,029,199 | 4/1962 | Baker et al. | 204/193.2 |
| 3,113,088 | 12/1963 | Josephson | 204/193.2 |
| 3,141,826 | 7/1964 | Friedrichs et al. | 176/7 |
| 3,155,594 | 11/1964 | Lehnert et al. | 176/8 |
| 3,255,404 | 6/1966 | Kidwell | 323/44 |
| 3,626,305 | 12/1971 | Furth et al. | 328/233 |
| 4,555,666 | 11/1985 | Martin | 326/233 |
| 5,175,466 | 12/1992 | Seward, III | 313/231.31 |
| 5,773,919 | 6/1998 | Seward | 313/231.31 |

FOREIGN PATENT DOCUMENTS

| | | |
|---|---|---|
| 925157 | 4/1973 | Canada . |
| 1157971 | 8/1985 | U.S.S.R. . |
| 96/38848 | 12/1996 | WIPO . |

OTHER PUBLICATIONS

Gilbert, S. L., et al., "Shell–Structure Phase of Magnetically Confined Strongly Coupled Plasmas" *Physical Review Letters*, vol. 60, No. 20, May 16, 1988, pp. 2022–2025.

Ono, M., et al. "Reflection at a Metal Surface in a Magnetically Controlled Beam Plasma Discharge" Database Inspec Institute of Electrical Engineers, Stevenage, GB, 1989 International Conference on Plasma Physics, New Delhi, India, Nov. 22–28, 1989, pp. 997–1000.

Chen, K.W., et al. "Compact Toroidal Energy Storage Device Using a Relativistically Electron Cloud Densified by Travelling Magnetic Waves (TMW)" *Digest of Technical Papers of the 4th IEEE Pulsed Power Conference*, Albuquerque, NM, USA, Jun. 6–8, 1983, New York, NY, USA, IEEE, USA, pp. 518–521.

(List continued on next page.)

*Primary Examiner*—Nimeshkumar D. Patel
*Assistant Examiner*—Mack Haynes
*Attorney, Agent, or Firm*—Hamilton, Brook, Smith & Reynolds, P.C.

[57] ABSTRACT

Electrons are arranged so they circulate along a spiral path in a vacuum. The path has a hollow symmetrical shape which is defined by a surface of a toroid. The shape is controllable by a magnetic field and the electrons can be contained within the shape. A containing force can be created by external electromagnetic fields, ions within the vacuum, or by interactions between the orbiting electrons themselves. The contained electrons store energy for later retrieval.

17 Claims, 22 Drawing Sheets

OTHER PUBLICATIONS

Radin, et al.,, "Physics for Scientists and Engineers," (Prentice–Hall 1982), pp. 559–560.

Malmberg, J.H., et al., "Pure Electron Plasma, Liquid, and Crystal," *Physical Review Letters*, 39(21):1333–1336, (Nov. 21, 1997).

Gilbert, S.L. et al., "Shell–Structure Phase of Magnetically Confined Strongly Coupled Plasmas," *Physical Review Letters*, 60(20):2022–2025, (May 16, 1998).

Hangst, J.S., et al., "Anomalous Schottky Signals from a Laser–Cooled Ion Beam,"*Physical Review Letters*, 74(1):88–89, (Jan. 2, 1995).

ARROWS INDICATE DIRECTION OF PARTICLE FLOW $F_x = q[V_y]B$ $F_y = -q[V_x]B + F_c$ $F_x = -q[V_y]B$ $F_y = q[V_x]B$

ENERGY STORAGE DEVICE HAVING A PLURALITY OF SINGLE CHARGED PARTICLES AND A CHARGE NEUTRALIZER

RELATED U.S. APPLICATIONS

This application is a continuation-in-part application of U.S. Ser. No. 08/455,221 filed on May 31, 1995, now U.S. Pat. No. 5,773,919 and Ser. No. 08/455,077 filed May 31, 1995, both of which are a continuation-in-part of U.S. Ser. No. 07/996,752 filed on Dec. 24, 1992, now U.S. Pat. No. 5,589,727 the teachings of which are all incorporated herein by reference in their entirety.

BACKGROUND OF THE INVENTION

At the present time, plasmas are difficult to contain and utilize. One notable use of plasmas utilizing particles of opposite charge is in fusion reactors wherein the dual-charged plasma is raised to high energy levels and contained within strong magnetic fields. The dual-charged plasma is amorphous in shape in that it is contained as a ring shaped mass held in place by magnetic fields and includes particles of unlike charge having pathways or orbits within the ring that are not precisely fixed or defined.

Plasmas with a single sign of charge have been previously studied. (See, e.g., "Non-Neutral Plasma Physics" (C. W. Roberson and C. F. Driscoll, ed.), AIP Conference Proceedings 175, Am. Inst. Physics, New York (1988).) These plasmas are known by several different names such as "nonneutral plasmas" or "single component plasmas." In nonneutral plasma research, studies are conducted in a regime of very stable plasmas with low speed energy per particle and low to modest plasma densities.

The main thrust of the studies of nonneutral plasmas is to achieve long term confinement of the plasmas and to study such properties as wave phenomena. In order to achieve long term confinement, these plasmas are stored in traps, such as the Penning trap, and are cooled to cryogenic temperatures. The free energy stored in these plasmas is minimized. The available energy per particle is typically about one electron volt or less. Typical densities studied are about $10^{13}$ $m^{-3}$ for conventional magnetic fields of about 700 Gauss or up to $4 \times 10^{16}$ $m^{-3}$ for high magnetic fields such as 80 kGauss (8 Teslas). These plasmas have very low ratios of plasma frequency to the cyclotron frequency. The relatively low density of these plasmas and their low stored energy per particle indicate that the total stored energy per unit volume, which is the product of the number of particles per unit volume times the energy per particle, is very low.

A traditional use of nonneutral plasmas is in particle accelerators such as cyclotrons where charged particles are raised to high energy levels and contained by complex magnets. The shape of the mass of charged particles is essentially amorphous. A third use of charged particles is for electron beams. These beams are useful for welding and deposition, but are transient in nature and of a simple, line geometry.

SUMMARY OF THE INVENTION

For the purposes of this invention, a single-charge or mono-charged plasma is defined as a collection of charged particles of like charge. That is, the mono-charged plasma or plurality of charged particles can be either all negatively, or all positively charged.

A plasma geometry that is fixed rather than amorphous is provided by the present invention in which the particles move in definable paths. When so configured, the mono-charged plasma will be containable and controllable to a far greater degree than an amorphous plasma. Energy can be added to or removed from the mono-charged plasma in a well defined, simple, and controlled manner opening new possibilities for energy storage.

The system provides a generator for a fixed geometry, mono-charged plasma having a specific toroidal shape. The system shapes the plasma into a toroid using a circular magnetic field generated by a charged particle beam, a single conductor, or a toroidal conductor coil, or other method.

A mono-charged plasma is shaped into a fixed and stable geometric form in which the orbit of the charged particles is definable and predictable. The geometry of the plasma will be a toroid, an elongated toroid, a figure eight shape or any number of desirable shapes. The toroid will be hollow, with a thin shell of orbiting particles. The particles orbit in various orbital layers based on the energy levels of the particles. That is, particles of lower energy have a smaller orbital radius than particles of higher energy. Within each orbit, adjacent particles couple together to form a matrix at temperatures of room temperature.

A fixed geometry plasma generator can include a vacuum chamber, electric field, charged particle source, and a circular magnetic field. In one embodiment of the fixed geometry plasma generator, a single conductor is used to generate a circular magnetic field. In another embodiment, a charged particle beam is used to generate a circular magnetic field. In yet another embodiment, a toroid conductor coil is used to generate a circular magnetic field. Microwave energy can also be introduced to raise the energy levels of the particles. In a preferred embodiment of the invention, the toroid coil is modified to generate an infinite family of fixed geometry mono-charged plasmas.

A charge neutralizer is used to neutralize the total charge of the system. The charge neutralizer can be a collection of ions, an image charge on a metal surface or an ion charge accumulator. The charge neutralizer is spatially segregated from the orbital layers or shell of the toroid.

A further embodiment of the invention relates to a vacuum tube system employing the charge neutralized toroid for energy storage. An electron source assembly can be sealed onto a port of the vacuum tube to provide controlled injection of electrons.

BRIEF DESCRIPTION OF THE DRAWINGS

The above, and other features of the invention including various novel details of construction and combination of parts, will now be more particularly described with reference to the accompanying drawings. It will be understood that the particular electron spiral toroid which embody the invention is shown by way of illustration only and not as a limitation of the invention. The particular features of this invention can be employed in various embodiments without departing from the scope of the invention.

DESCRIPTION OF THE PREFERRED EMBODIMENT

A single-charge or mono-charge plasma is defined herein as a collection of charged particles of the same charge. Examples of charged particles are electrons and ions. A toroid is defined herein as a surface generated by the rotation of a plane closed curve about an axis in the plane. A typical toroid has a donut shape in a three-dimensional configuration.

In accordance with a preferred embodiment of the invention, electrons arranged in an Electron Spiral Toroid (ESI) are used to store energy. Alternatively, ions can be arranged in an Ion Spiral Toroid (IST) to store energy. Because ions are more massive than electrons, ions move slower than electrons and can provide a more stable geometry. In practice, however, it is more difficult to achieve a high current from protons than from electrons. For this reason, preferred embodiments of the invention are generally described using electrons to store energy.

Figure 2:
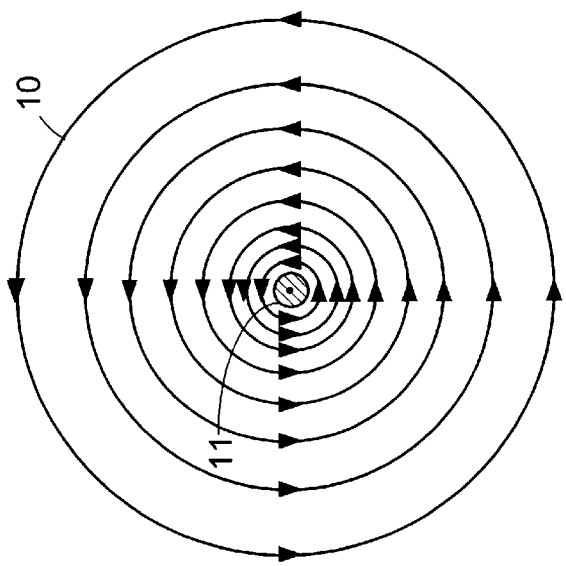
FIG. 2 is a schematic diagram of a cross sectional view of a circular magnetic field of FIG. 1 taken perpendicular to the conductor.
Figure 1:
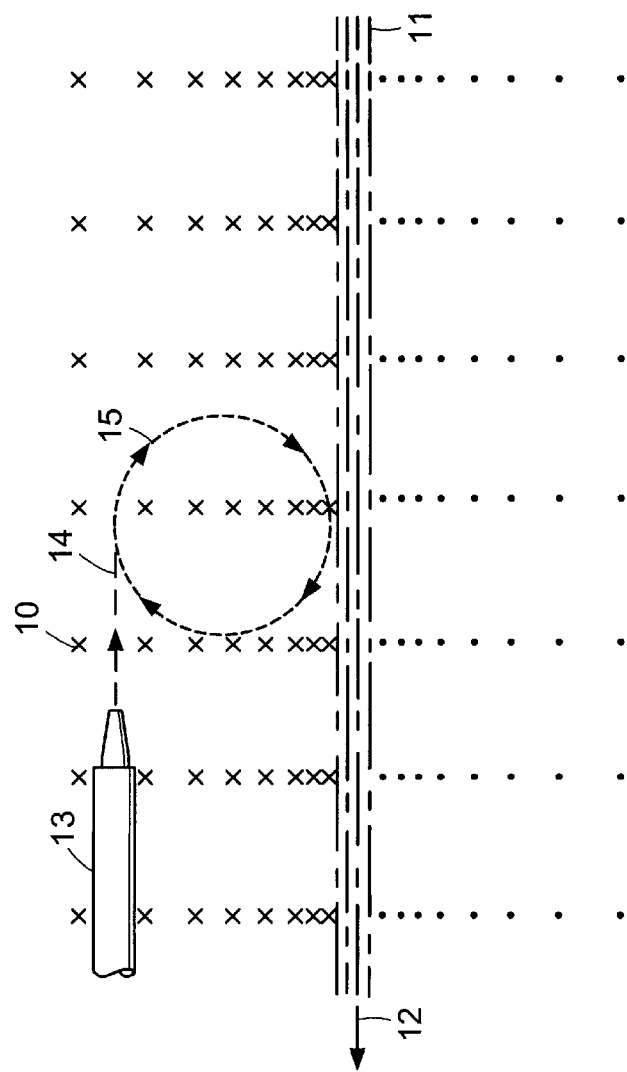
FIG. 1 is a schematic diagram of a view of a preferred embodiment of the invention taken transverse to an initiating conductor.

FIG. 1 is a schematic diagram of a view of a preferred embodiment of the invention taken transverse to an initiating conductor. The elements required to initiate an electron plasma toroid are an electron beam 14, a circular magnetic field, an electric field provided by field plates, an accumulation of ions, or local ions, and a vacuum chamber. Circular magnetic field lines 10 are shown where using conventional notation, an "x" indicates field line in the direction into the page, and a "." indicates a line out of the page. FIG. 2 is a schematic diagram of a cross sectional view of the circular magnetic field of FIG. 1 taken perpendicular to the conductor.

A method of generating the circular magnetic field is shown in FIG. 1 using an electrical conductor 11 carrying an electrical current 12 in the direction shown. The conductor 11 can be a single conductor, a series of conductors, or a charged particle beam, as long as an electrical current is present which creates a sufficiently strong circular magnetic field.

The chamber into which the charged particles are injected can be evacuated, but a small electric field is required to overcome the drift velocity of the particles. Alternatively, for the case of electrons, the chamber can be partially evacuated, with pressure levels high enough to allow ions to develop in sufficient quantities to counter the drift velocity.

An electron beam source 13 is used to initiate the electron beam 14. The electron beam 14 curves as shown in FIG. 1 due to the presence of the magnetic field in accordance with $\overline{F}=q\overline{V}\times\overline{B}$, basic law of physics where $\overline{F}$ is force, $\overline{B}$ is magnetic field strength, $\overline{V}$ is particle velocity, and q is particle charge. Although the forces are described by vector equations, the vector forces can be reduced to scalar equations herein because of the symmetry of the toroidal geometry. The electron beam 14 can be replaced with a charged particle beam, either positively or negatively charged, although care must be taken to allow for proper rotation in the circular magnetic field in accordance with the laws of physics. The shape of the orbit is defined by the balance of forces:

F=qVB and
F=ma, where:
q is the charge of the particle;
V is the velocity of the particle;
B is the magnetic field strength;
m is the mass of the particle; and
a is the acceleration of the particle.

If the circular magnetic field and rotational force of the charged particle are in balance, similar to a cyclotron, the beam 14 forms a circular orbit 15 as shown.

As the electrons rotate in the magnetic field multiple orbits form. The multiple orbits spread out into a spiral because like charges repel. The electron beam 14 can be slightly at an angle to the axis of the conductor 11 to facilitate the spreading and spiraling of the electrons.

The electrons require a further restoring force to remain in orbit. This is required to counter the drift velocity and can be done by providing an electric field to counter the drift velocity. Field plates are not shown here, but are discussed below.

An alternate method of countering the drift velocity is with the use of ions. By providing a partially evacuated chamber, the electrons in orbit collide with the gas molecules in the chamber, producing ions. If done correctly, the field of the ions offset the drift velocity of the electrons. This is also discussed more fully below.

Figure 3:
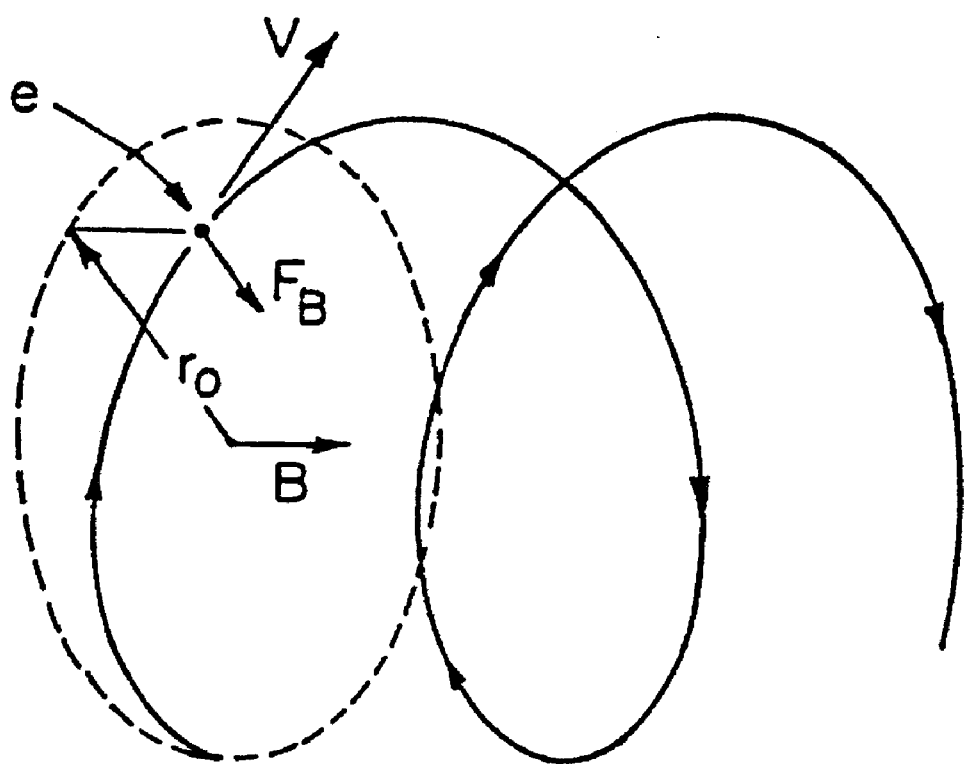
FIG. 3 is a schematic diagram of a spiraling electron orbit.

FIG. 3 is a schematic diagram of a spiraling electron orbit 31. As illustrated, an electron e spirals around the central axis of the magnetic field at a radius $r_o$ due to the magnetic force $q\overline{V} \times \overline{B}$.

The orbit of the electrons is generally circular, but can vary somewhat from circular as a function of the change in strength of the magnetic field as the distance from the conductor increases. In a typical configuration the electron velocity V is approximately $5*10^7$ meters/second. The velocity V can vary from higher to lower values as long as the balance of forces is maintained. The velocity of all the electrons is substantially uniform. The circular magnetic field in a preferred embodiment is generated by an approximately 1000 amp-turn coil. The current can vary from higher to lower values as a function of force required to retain the electrons in orbit.

Figure 4:
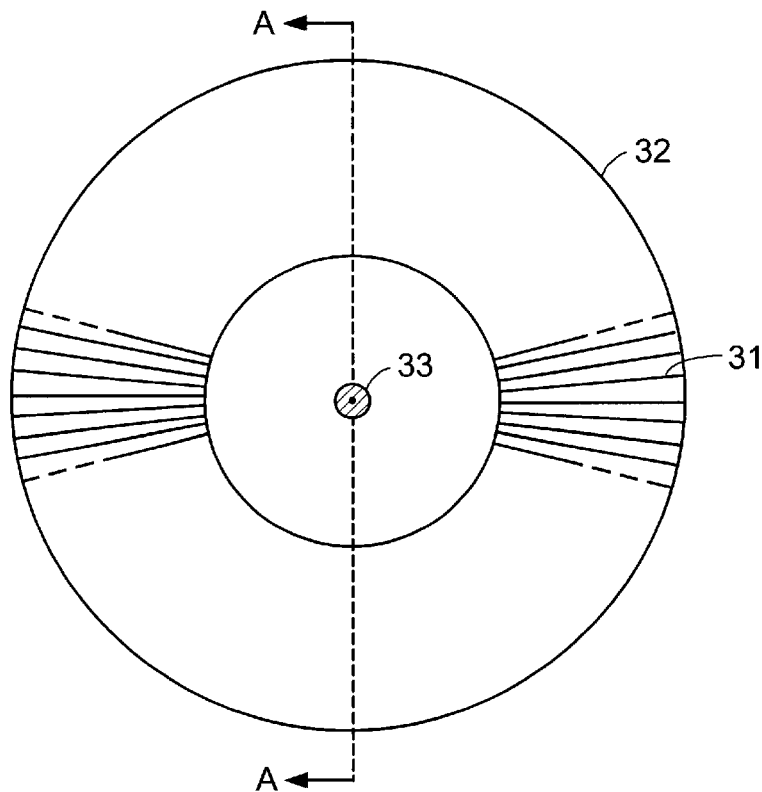
FIG. 4 is a schematic diagram of a top view of a toroidal plasma of FIG. 1.

FIG. 4 is a schematic diagram of a top view of the toroidal plasma of FIG. 1. As the electrons spread out, they remain in the orbits 31 due to the force of the circular magnetic field, but spread as shown into a toroid 32. This results in an electron plasma toroid. The orbits 31 are connected as one large spiral and the number of orbits can vary. If the electrons are replaced with charged particles, the result is a charged particle plasma toroid.

Figure 5:
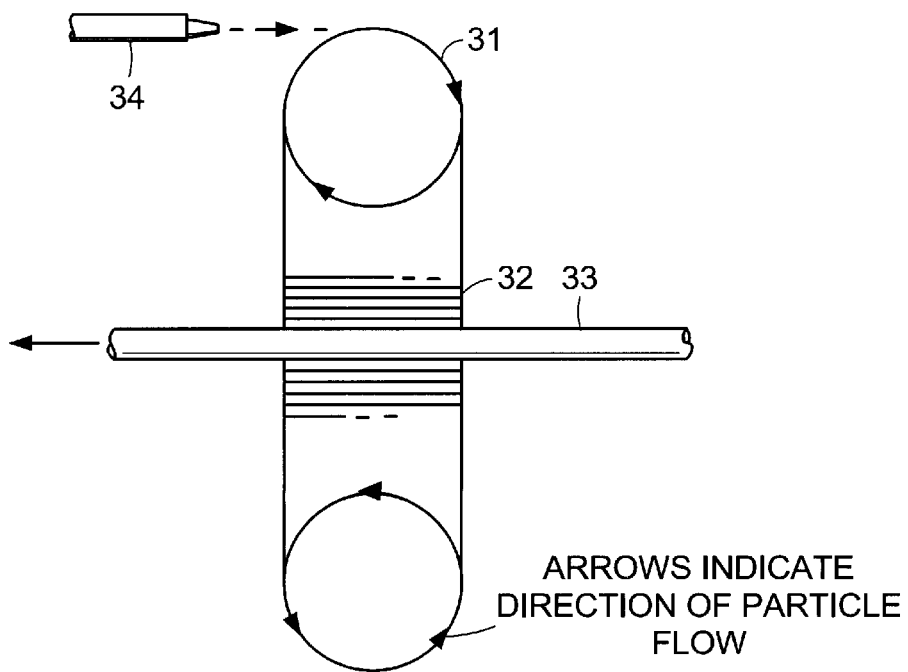
FIG. 5 is a schematic diagram of a cross sectional view of the toroidal plasma of FIG. 1 taken along line A—A of FIG. 4.

FIG. 5 is a schematic diagram of a cross sectional view of the toroidal plasma of FIG. 1 taken along line A—A of FIG. 4. Note the conductor 33 and the electron beam generator 34. The details of the circular magnetic field are omitted in FIGS. 4 and 5, to allow a clearer picture of the toroid, but they are similar to those shown in FIGS. 1 and 2.

The circular magnetic field can be generated in many ways. The conductor approach is perhaps the simplest in concept. The conductor can be replaced, however, with a charged particle beam. A particle beam and a plasma are best generated and maintained in a vacuum where the reduced atmosphere reduces collisions between gas molecules and particles. The collisions with air or gas molecules thus shorten the life of the plasma. Vacuum levels required to establish a particle beam are well known. As a rule, the better the vacuum the fewer collisions and the longer the life of the plasma. An electric field is required, however, to overcome drift velocity.

Low vacuum levels are preferred as collisions can thereby be minimized to increase the mean beam length and to reduce the energy needed to maintain the beam. A ultra-high base vacuum in the range of $10^{-7}$ Pa or better is preferred. Alternatively, higher pressure can be used in the initiation of an electron spiral toroid. In this instance, collisions between the electrons and gas molecules, such as hydrogen, create ions. The ions, in turn, neutralize the drift velocity of the electrons. Hydrogen is a preferred gas because hydrogen has the advantage of ionizing only one time, which provides a useful collision characteristic. Described below is a vacuum tube with a vacuum level of approximately 0.1 Pa. Toroids have been observed with pressures as high as one atmosphere (100,000 Pa), and routinely at 2,500 Pa.

After the electron plasma toroid has been initiated, the electron plasma toroid can be held in place by any of several external force mechanisms. First, the circular magnetic field can be maintained, or secondly, a suitable electric field can be used, or thirdly, ions in the vacuum chamber, being of opposite charge, will provide a suitable restoring force under some circumstances. The original circular magnetic field can be removed and the electron plasma toroid can substantially retain its configuration if a sufficient number of electrons are in the plasma and sufficient ions are present or a suitable electric field is present.

Initiation

The initiation of an Electron Spiral Toroid (EST) requires that a balance of forces be maintained between the spiral of electrons and the circular magnetic field. The formulas for this are the same as for a cyclotron.

To initiate the EST, an electron beam is preferably injected into a circular magnetic field. The electron beam then spirals in the presence of the magnetic field, given the appropriate angular injection into the field. Returning to FIG. 3, the injected beam spirals in a magnetic field, B. The electron velocity V, the magnetic field B, and the resulting force F are all orthogonal to each other. If the magnetic field is circular, the electrons spiral around the magnetic field, following field lines. With proper initial conditions, the spiraling electron beam curves around the circular magnetic field and rejoins itself. Electrons in the rejoined spiral thus form a current ring. The initiation is done in a vacuum to minimize collisions. This initiation is described in the above-referenced U.S. Pat. No. 5,175,466, the teachings of which are incorporated herein by reference.

The electron spiral motion is caused by the magnetic field of the initiating coil. As an electron beam first enters the initiating coils, it crosses magnetic field lines which cause the electrons in the beam to spiral. The electron motion at this moment of initiation is established by four forces: the force from the magnetic field; the rotational force of the electrons; the coulombic force from the other electrons in the beam, and a force due to ions near to the EST.

The force of rotation and the coulombic force tend to expand the electrons away from the initial beam. The magnetic field of the initiating coils must be great enough to counter the coulombic force and the rotational force. The force of the ions in this case is small enough to ignore. This balance is demonstrated in an electron beam as follows:

The force of rotation is given by:

$$F_R = \frac{mV^2}{r_o}$$

where:
  m is electron mass;
  $r_o$ is the orbit radius; and
  V is electron velocity.

The coulombic force in the beam is given by:

$$F_I = q(I)(1/(2\pi\epsilon_o r_o))$$

where:
  q is the charge of the particle;
  I is the charge per length of the beam; and
  $\epsilon_o$ is the permittivity constant.

The force of the initiating coil is given by:

$$F_L \leq qVB$$

where:
B is the magnetic field of the initiating coils.
The magnetic field for the toroid can be expressed as:

$$B_T = \frac{\mu_o i_T n_T}{2\pi r_T}$$

where:
$\mu_o$ is the permeability constant;
$n_T$ is the number of loops; and
$i_T$ is the current per loop;
$r_T$=radius of the toroid as measured from the center of the toroid to the axis of the particle orbits.

When $F_R+F_I=F_L$, the balance of forces between electrons in a spiraling beam and the magnetic field of the initiating coil is achieved. In a preferred embodiment, the forces are:

$F_R=6.6*15^{13}$ Newton for $V=9.37*10^7$; $r_o=0.122$ meter.

$F_I=2.5*15^{12}$ Newton for beam current, i=1000 amperes.

$F_L=3.17*15^{12}$ Newton for 20,600 amp turns; and $r_T=0.196$ meters.

The initiating coil can be a single wire with high current, or it can comprise a series of coils. The spiraling beam follows the field lines around the toroid. The coil parameters are typically set to make $r_o$ the same size as the EST in steady state. The forces shown are the major forces of initiation. When a further force is needed to provide a balance during initiation it can be provided by an external electric field or by ions as is explained in more detail below.

Steady-State Forces
Magnetic and Coulombic Forces

Once the EST is established, it can be thought of as a collection of current loops. The electrons travel in the same direction around the loops. The total force of all charges on any electron at point P on the outermost surface of the toroid is the coulombic force:

$$F_C = \frac{n_p e^2}{(2\pi)^2 \varepsilon_o r_T r_0}$$

where:
$n_p$ is the number of charged particles; and
e is the electron charge.

The coulombic forces cause all the electrons to move to the surface of the EST, where they become a sheet current.

Because the EST is a toroid, there is an internal magnetic field. An electron which moves into the center of the EST is subjected to a force as follows:

F(Magnetic)=$F_M$=qVB; where:

$$B_T = \frac{i_o \mu_o n_o}{2\pi r_T}$$

where:
$n_o$ is number of orbits; and
$i_o = q(2\pi r_o/V)^{-1}$

Orbit Forces Acting On The Electrons

Before the balance of forces for the EST can be calculated, the forces on the individual electrons must be considered.

Figure 7:
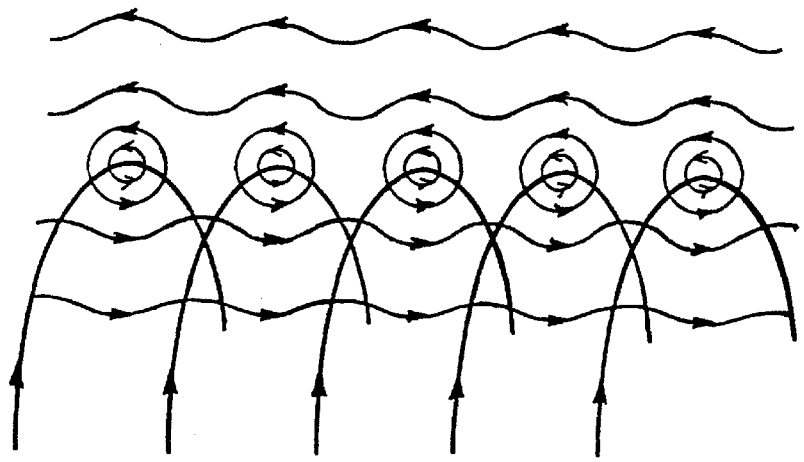
FIG. 7 is a schematic diagram of field lines around an electron orbit.

During initiation, the electrons move from a beam configuration into electron parallel orbits. This new configuration sets up new field interactions between the orbits and the individual electrons. The electrons travel in parallel orbits which act like current loops. The orbits set up magnetic fields shown in FIG. 7.

Figure 8A:
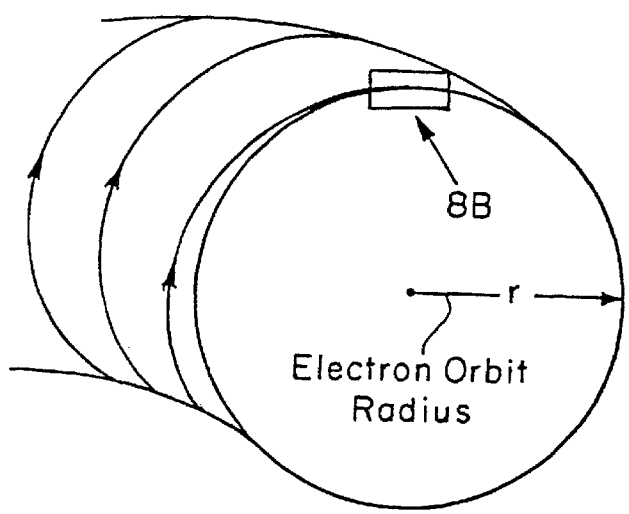
FIG. 8A is a schematic diagram of an electron orbit in an electron spiral toroid.

As the electrons pass through these magnetic fields, in conjunction with the electrostatic fields, they are perturbed into an oscillation around the beam orbit. FIG. 8A shows one full electron orbit in the EST. A small section of the electron orbit is expanded into FIG. 8B, and shows the oscillatory motion of the electrons themselves.

Electron Near Field Equations

Figure 9A:
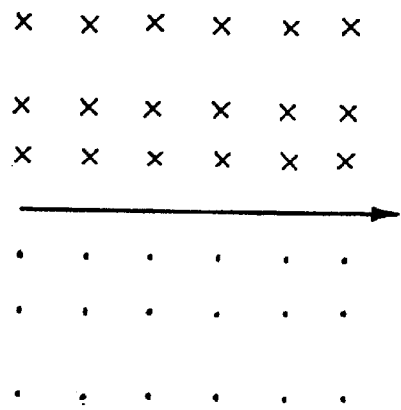
FIGS. 9A–9E are graphical diagrams of forces acting on an electron at points above and below the orbit.

Once the EST is established and the electrons assume the form of a sheetcurrent, the electrons interact with the magnetic fields of the orbits as shown in the force diagrams of FIGS. 9A–9E. FIG. 9A shows the magnetic fields above and below the electron orbit and can be thought of as a side view of FIG. 7.

Figure 9B:
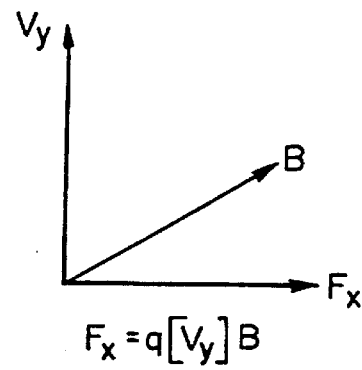

As the electron moves above the orbit, FIG. 9B shows the vector relationship of the magnetic field, the velocity, and the horizontal component of the force acting on a single electron.

Figure 9C:
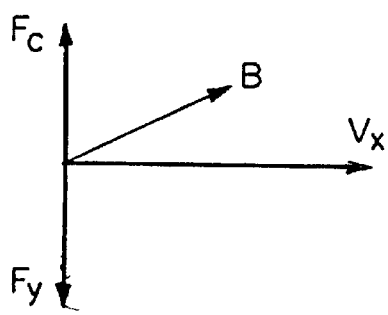

In the EST there is also a coulombic force, due to the total amount of electrons. This acts on the electron only in the vertical direction, and only when the electron is above the orbit. The component of the forces acting on an electron which moves above the orbit is shown in FIG. 9C.

As a single electron moves above the orbit, it is acted upon by the repulsive force of the charge of the other electrons in the sheet. It is also acted upon by the force of the magnetic field, which causes the orbit of the electron to curve, turning it around and sending it downward.

Figure 9D:
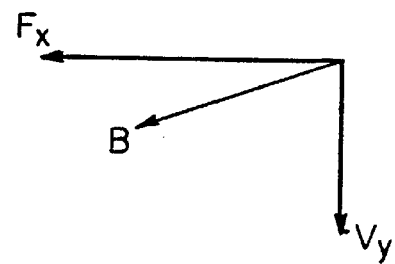
Figure 9E:
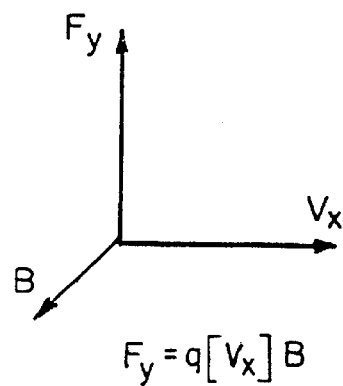

Once below the orbit, the electron encounters a reversed magnetic field which turns the electron around and sends it back above the orbit. Below the orbit, there is no force due to space charge. The horizontal and vertical forces acting on the electrons are shown in FIGS. 9D and 9E, respectively.

The equations for the electron motion are shown below. Note that the subscripts "A" and "B" denote forces above and below the orbit, respectively; because there is a difference as explained below. From FIGS. 9C and 9D:

$$F_{XA} = eV_{YA}B_A = \frac{md\,V_{XA}}{dt}; \qquad F_{XB} = -eV_{YB}B_B = \frac{md\,V_{XB}}{dt}$$

$$F_{YA} = -eV_{XA}B_A + F_c = \frac{md\,V_{YA}}{dt}; \qquad F_{YB} = eV_{XB}B_B = \frac{md\,V_{YB}}{dt}$$

where:
e is the electron charge; and
$F_c$ is the coulombic force from the total EST.

For completeness, the forces of rotation must be included here. However, those forces are many orders of magnitude less than the magnetic and coulombic forces, and have been left out for simplicity.

Above the orbit, $B_A$ increases with distance above the orbit to a point, then decreases. Below the orbit, $B_B$ is the same as $B_A$ but of opposite sign, if only the magnetic field due to the orbit currents is considered. However, below the orbit there is an additional component of the magnetic field due to the EST. This additional component has the effect of making the magnitude of $B_B > B_A$, because $B_B = B_A + B_T$.

Solving the above differential equations:

$V_{XB} = V_\parallel \cos \omega_B t$;

$V_{XA} = C \cos \omega_a t + F_c/\omega_A m$;

$\omega_A = eB_A/m;$ $V_{YB} = V_\perp \sin \omega_B t$ $V_{YA} = -D \sin \omega_A t;$ $\omega_B = eB_B/m$ where:

$V_\parallel$ is the initial velocity component parallel to the orbit of the injected electrons;

$V_\perp$ is the initial velocity component perpendicular to the orbit;

C and D are constants which relate to the time at which the electrons cross the average orbit; and $\omega_A$ and $\omega_B$ are the frequency of oscillation above and below the orbit, respectively.

Figure 8B:
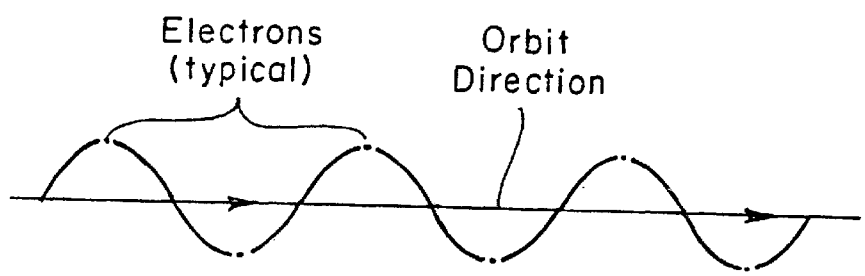
FIG. 8B is a schematic diagram of electron motion around the orbit of FIG. 8A.

The electrons do not cross at a convenient zero point of the sinusoid, but rather at an intermediate point of the cycle. Solving for the constants C and D results in:

$C = (V_\parallel \cos \omega_B T_1 - F_c \omega_A m)/(\sin \omega_A T_2)$ $D = (V_\perp \sin \omega_B T_3)/(\cos \omega_A T_4)$ The above equations show that the velocity of the electrons above the orbit is different than the velocity of the electrons below the orbit. The difference is a function of the coulombic force $F_C$, and the difference between $B_A$ and $B_B$. The orbit is an average position the electrons cross as they move above and below it. There is no discontinuity across the orbit, because the magnetic field at the point of the orbit is zero. The electrons essentially "coast through" the zero magnetic field region. FIG. 8B approximately shows the oscillatory motion.

The oscillatory motion of the electrons only continues as long as the oscillation is stable. In essence, if the electron excursion above the orbit becomes too great, the electrons expand indefinitely, and do not restore into the orbit. The stability condition which must be met is:

$F_c/eV_\parallel B_A = \cos \omega_B T_1$ where:

$T_1$ is the time at the electron maximum above the orbit.

This ratio is the drift velocity, which must be less than one for stability to be possible. An external electric field or external ions is used to maintain a stable drift velocity. In a charge neutral system, $F_c$ equals zero to ensure stability.

Figure 6:
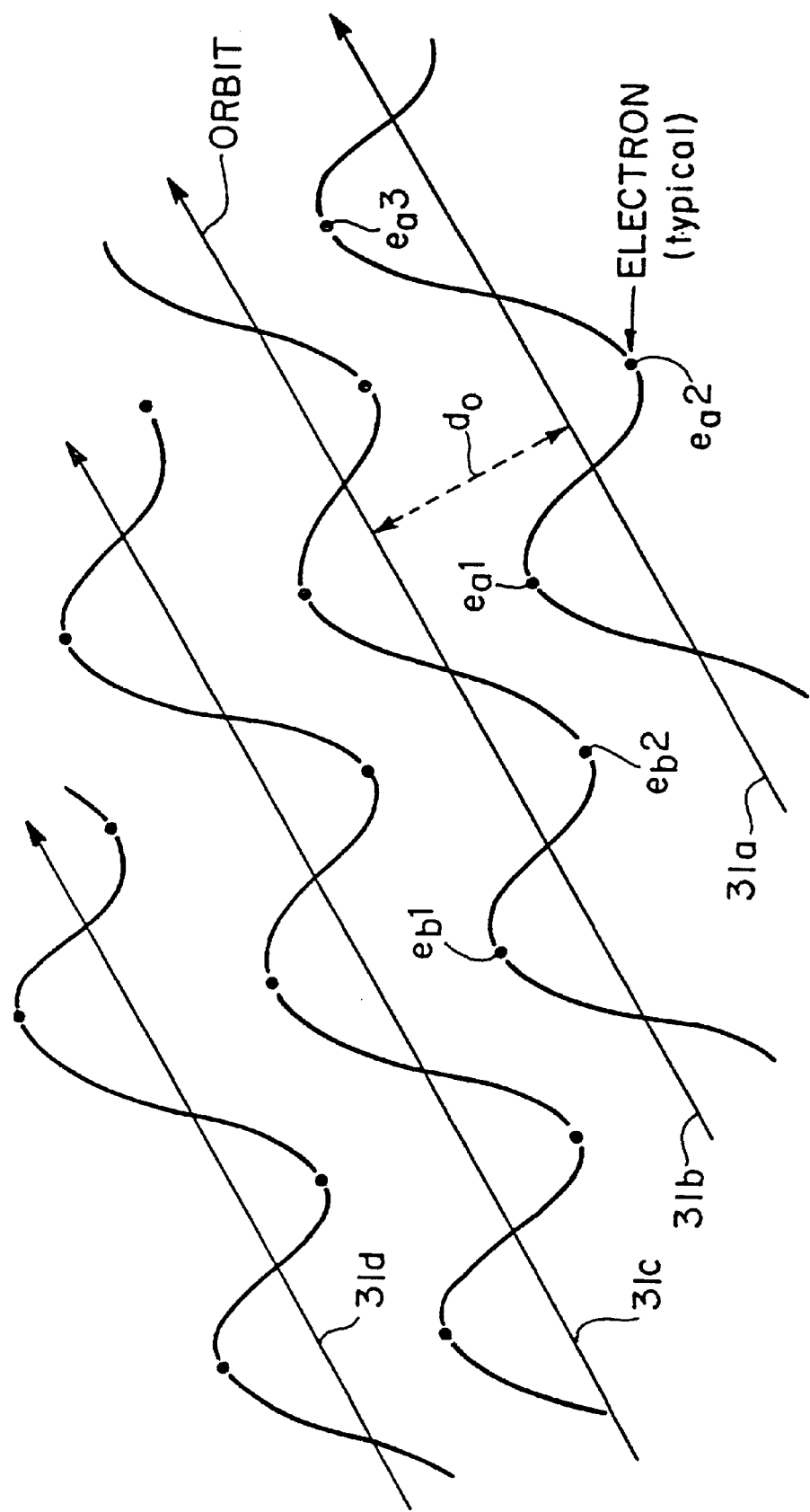
FIG. 6 is a schematic diagram illustrating at a microscopic scale four adjacent electron orbits.

The surface of the EST consists of closely spaced parallel orbits of electrons. Superimposed on these orbits is a sinusoidal motion. It is this sinusoidal motion that interacts with the fields of the EST to keep the electrons in orbit. The result is a surface which appears schematically in FIG. 6 to be parallel orbits, closely spaced, with an oscillatory motion.

Alternative Preferred Initiating Embodiments

Figure 12:
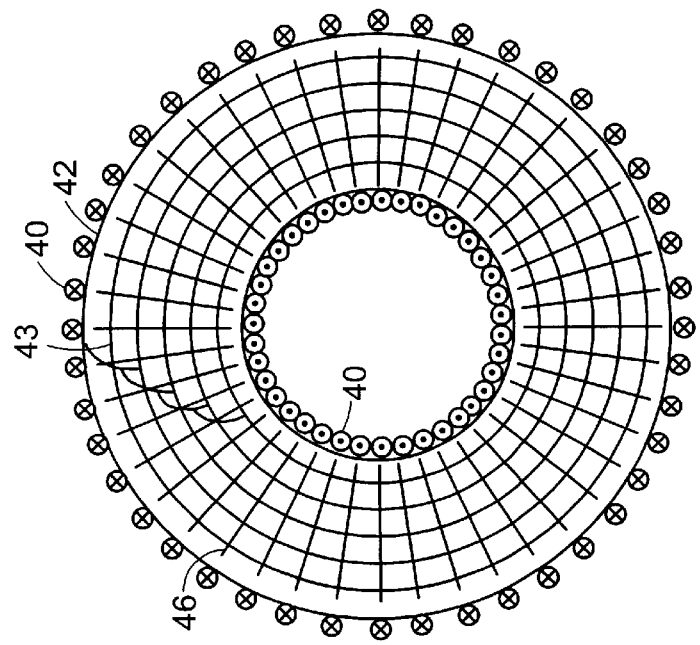
FIG. 12 is a schematic diagram of a cutaway top view taken along line C—C of the toroidal conductor coil of FIG. 11 with details of the internal toroid plasma.
Figure 11:
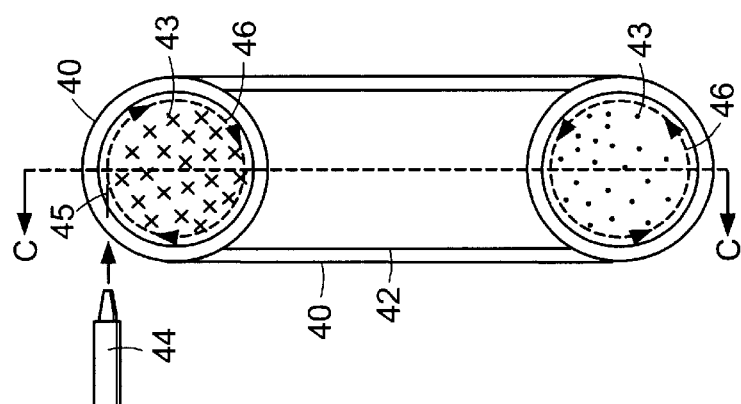
FIG. 11 is a schematic diagram of a cross sectional view taken along line B—B of the toroidal conductor coil of FIG. 10 with an internal toroid plasma.
Figure 10:
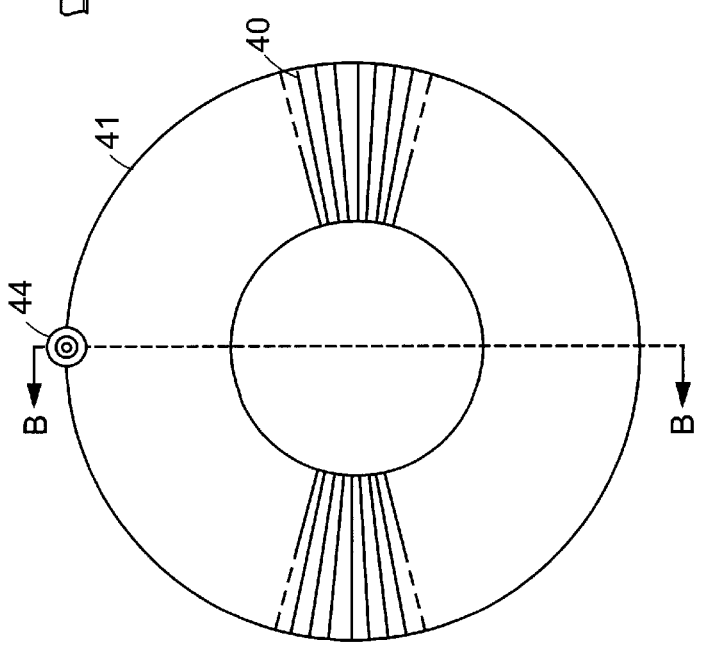
FIG. 10 is a schematic diagram of a top view of a toroidal conductor coil.

FIGS. 10, 11, and 12 show an alternate method for initiating a single-charge plasma particle toroid. FIG. 10 is a top view of the toroidal conductor coil; FIG. 11 is a cross sectional view taken along line B—B of the toroidal conductor coil of FIG. 10 with a toroid plasma internal; and FIG. 12 is a cutaway top view taken along line C—C of the toroidal conductor coil of FIG. 11 with details of the internal toroid plasma. The circular magnetic field is initiated by utilizing a conductor toroid having an electrical conductor 40 wound in the shape of a toroid 41 around a casing 42. The casing 42 is made of a suitable material such as glass which can withstand a vacuum. The casing 42 is shown in FIGS. 11, and 12. The circular magnetic field 43, shown schematically in FIGS. 11, and 12, is created when a current is sent through the electrical conductor 40.

The number of windings required is a function of the circular magnetic field strength required and the strength of the electrical current which flows through the electrical conductor 40. With 1000 turns in the conductor toroid, the circular magnetic field created by 3–6 amperes is comparable to the circular magnetic field generated by a 3000–6000 ampere current in a single conductor.

The number of windings is shown schematically in FIGS. 10 and 12 and can vary depending on the current per conductor and the required magnetic field. An electron beam source 44 is used to initiate an electron beam 45. The beam spreads out into an electron plasma toroid inside the conductor toroid. A typical orbit 46 spreads into a spiral as described previously in connection with FIGS. 3 and 4.

Figure 13:
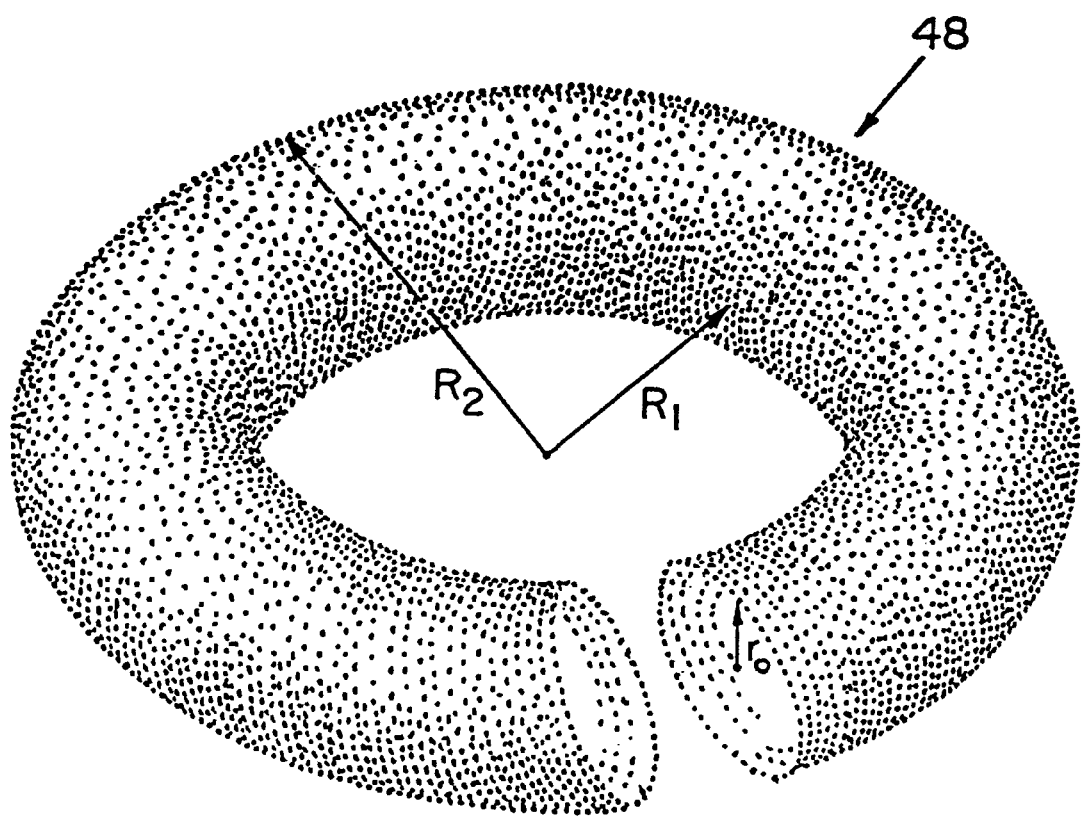
FIG. 13 is a partially cut-away perspective view of the toroidal geometry of the plasma.

FIG. 13 is schematic diagram of a partial cut-away perspective view of the toroidal geometry of the plasma. When initial conditions have been properly established, the spiraling electron beam curves around the circular magnetic field and rejoins itself. The electrons in the rejoined spiral form a current ring with a toroidal path 48 as illustrated. Once the spiral is established, the electrons spread out into a thin, hollow sheet. The electrons all move in parallel orbits and travel at the same velocity. The electrons have substantially the same energy because they all come from the same electron beam. In addition, multiple orbits of the spiral in the magnetic field ensures electrons with greater or lesser velocity are moved into higher or lower orbits, respectively, by the forces of rotation. The adjacent orbits each, therefore, contain electrons with the same energy. Also, this process assures adjacent orbits have substantially the same current.

The toroid is a sheet of current having a hollow, thin, spiraling sheet of electrons. The electrons spiral with a radius $r_o$. The toroid is illustrated as a circular toroid having an inner radius $R_1$ and an outer radius $R_2$, where $R_2 = R_1 + 2r_o.$ The coil can be elongated into an oval form and still maintain a plasma of a fixed geometry, although not toroidal. The coil can be altered in an infinite number of slight variations but still maintain a plasma of fixed geometry (slightly varied from toroidal).

Figure 14:
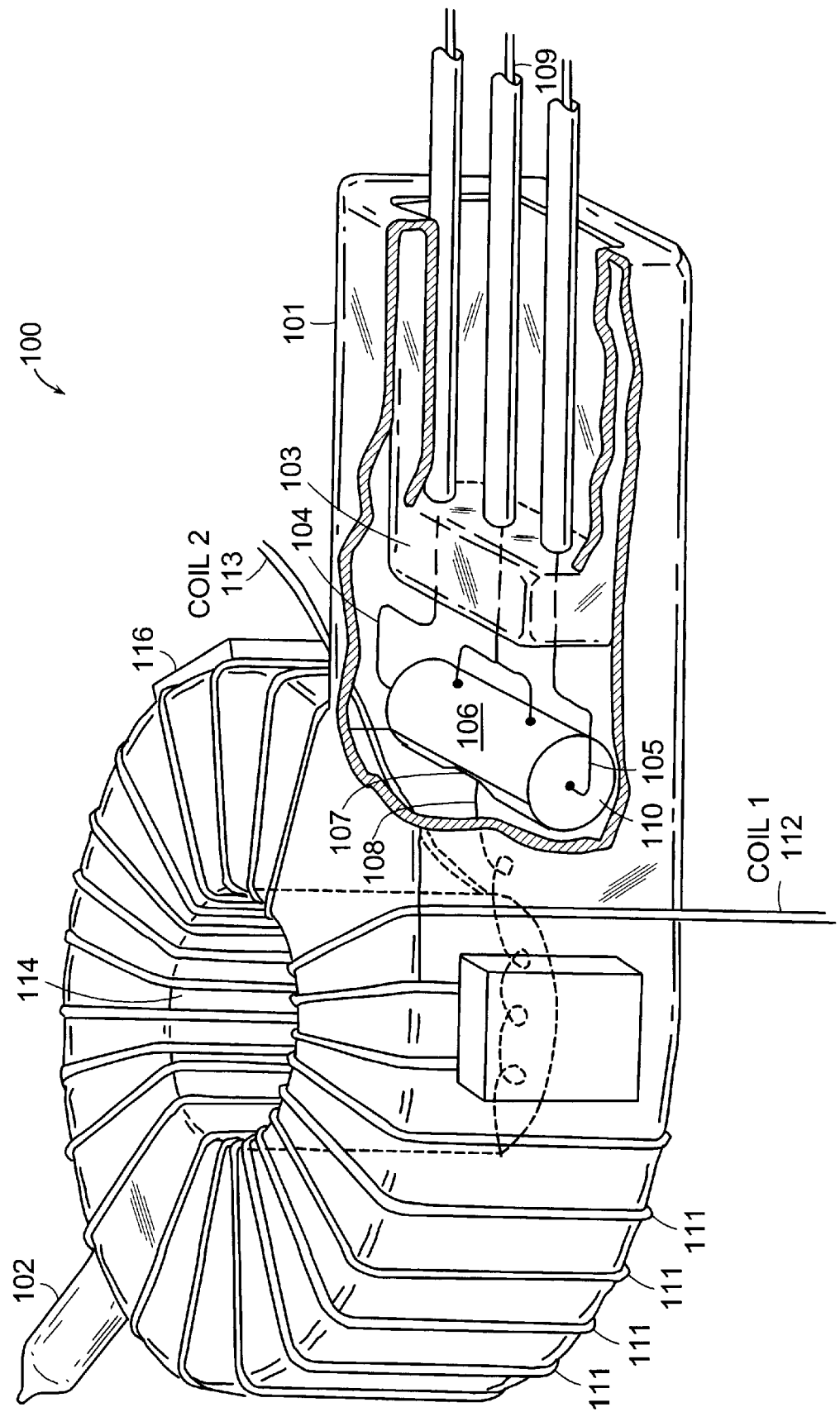
FIG. 14 is a partially cutaway perspective view of a toroid plasma tube.

FIG. 14 is a schematic diagram of a partial cut-away perspective view of a toroid plasma tube 100. The tube has a glass enclosure 101. The glass enclosure is a vacuum tube material suitable to hold a good vacuum. The tube 100 in this embodiment has a diameter of about 10 cm. The orbital cavity is 3.75 cm high along the outer and inner walls. The vacuum level is preferably about 0.1 Pa to provide a beam length of approximately 10 cm. The dimensions of the tube 100 depend upon the particular application.

A vacuum port 102 is used to evacuate the tube 100 to remove all gases, as is typical for a vacuum tube. After evacuation of the tube 100, the port 102 is sealed to retain the vacuum. Alternately, a standard vacuum flange can be fitted to the vacuum port to allow evacuation. A glass base 103 is provided to position the electron source assembly and to pass wires from outside the tube 100 into the vacuum.

As in many vacuum tubes, a filament is provided and is heated to facilitate electron flow. Power is supplied to the filament through a wire 104 to a resistance wire (see FIG.

15) and to ground return through wire 105. This provides heat which creates free electrons at the cathode (see FIG. 15). This is a well-known technique that can be realized in many ways.

The electrons are accelerated by the anode 106. The anode 106 is tubular, with a slit 107 through which electrons emerge to form a beam 108. The anode 106 provides acceleration voltage through an external circuit connected by a wire 109. The anode 106 readily forms a beam at 50 VDC to 300 VDC, and above, with more voltage providing more acceleration and therefore faster moving electrons. The anode 106 is insulated from the cathode by insulators 110.

A coil 111 is provided to produce a magnetic field. Coil windings are shown schematically, as many more are needed than shown. The coil produces a field which is a circular magnetic field and circles through the portion of the tube covered by the coil. All coils are wound in the same direction and connected together in one large spiral, or solenoid. The two ends of the coil are brought out as a first coil 112 and a second coil 113 to be connected to an external power supply for power. For this version of the toroid plasma tube, a current in the range of 3 amperes to 25 amperes causes the beam to spiral in varying orbit diameters. The coil is wound on the outside of the tube, as a convenient method of fabrication, but could reside within the tube as long as the beam has room to spiral. An essential feature of the toroid plasma tube is the center hole 114 which allows the coil to be wound into a toroid. This feature allows the generation of a circular magnetic field. Due to the construction of the tube, the coil is not totally symmetrical, so small auxiliary magnets 115, 116 are placed as required to shape the orbit of the beam path.

Figure 15:
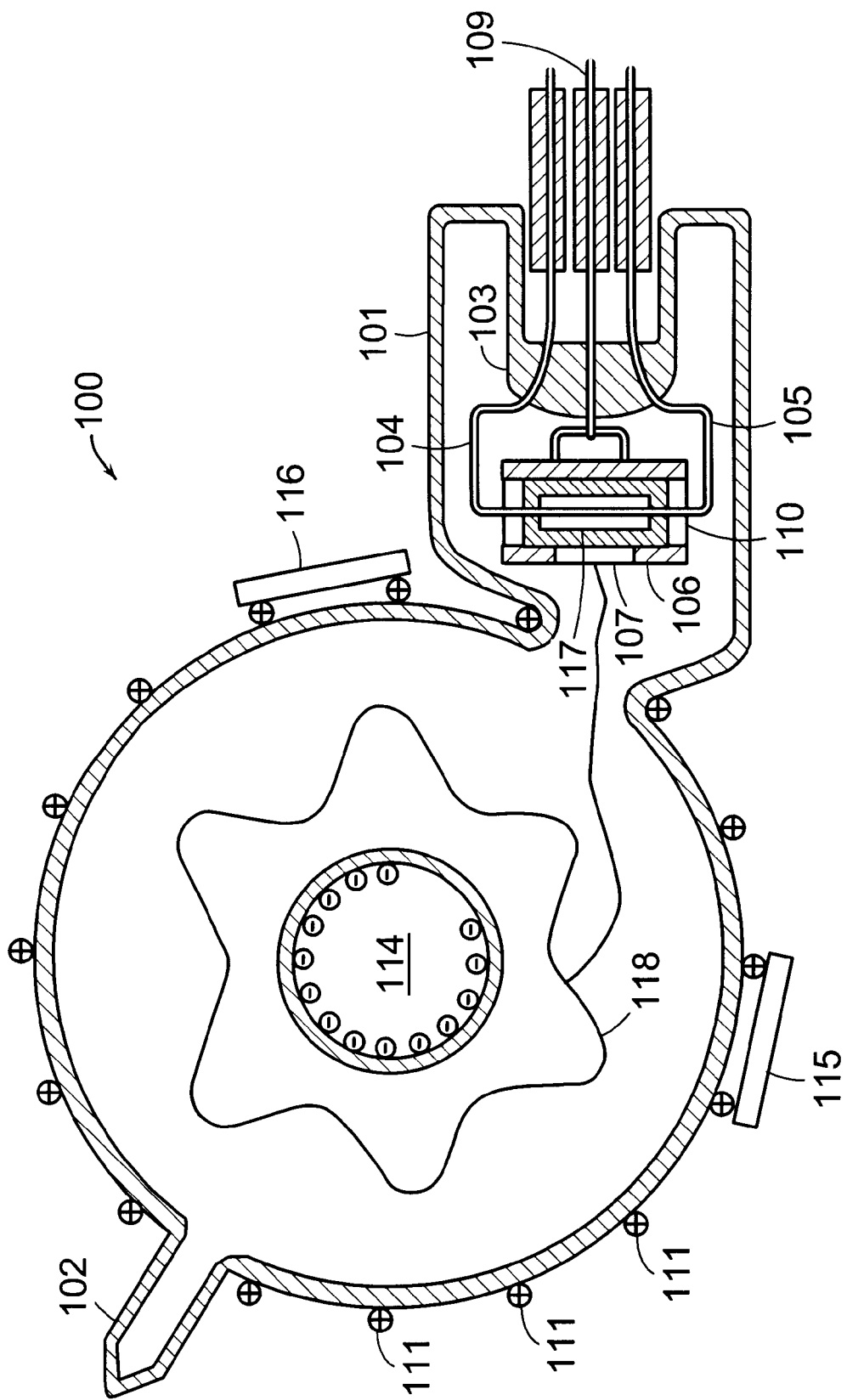
FIG. 15 is a cutaway top view of the toroid plasma tube of FIG. 14.

FIG. 15 is a schematic diagram of a cut-away top view of the toroid plasma tube. One additional detail not shown in FIG. 14 is the cathode wire 117 which resides inside the anode assembly. A cathode material is coated over the wire 117.

In the cut-away view, the cathode wire 117 is shown as being insulated from the anode 106 by insulators 110. The electron beam spiral is shown in its complete path 118. Coil wires 111 are shown, in a representative number, but not in total numbers as they are too numerous to fully illustrate with clarity. Similarly, the electron beam spiral is shown schematically as many more orbits occur than can be shown. Current direction is shown using standard conventions.

Figure 16:
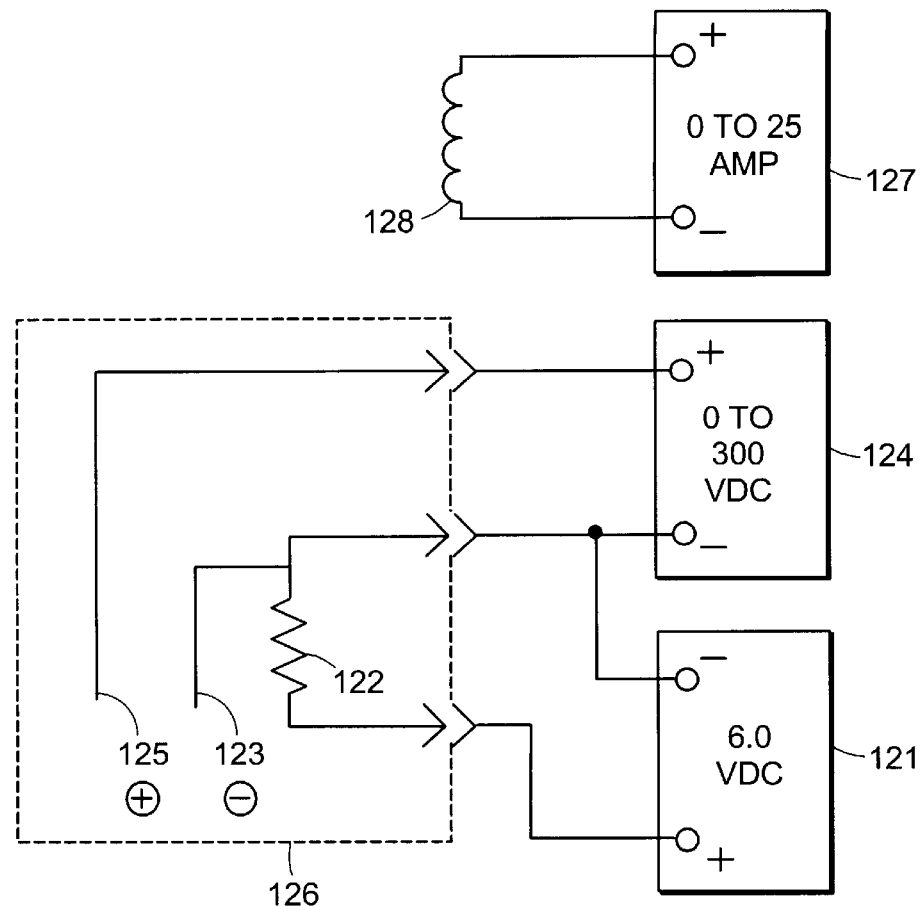
FIG. 16 is a schematic circuit diagram of the toroid plasma tube system.

FIG. 16 is a schematic circuit diagram which shows the electrical connections of the toroid plasma tube. A filament supply 121 heats the filament 122. The cathode 123 produces electrons. The anode supply 124 provides an electron accelerating voltage to the anode 125 which accelerates the electrons into a beam. The cathode 123, anode 125, and filament 122 reside within the vacuum tube 126. The coil power supply 127 provides power to the toroid coil 128. The toroid coil produces the circular magnetic fields.

The amount of energy stored in the toroid can be calculated using standard laws of physics. Each electron stores energy. In the toroid, all electrons have substantially the same velocity and substantially the same energy. Total energy stored is therefore the product of the total number of electrons and the energy per electron.

Initial prototypes used low energy electrons at 50 to 150 electron-volts (eV). Electrons can be accelerated to approximately 25,000 eV, without significant synchrotron radiation losses, and much higher where losses can be tolerated. The total number of electrons stored can be great because increasing electron quantity increases the magnetic restoring force and maintains the balance of forces. Initial prototypes have had small total charge. Charge total greater than ten coulombs have been observed. More than that appears possible.

Initiating and Containing

Figure 17:
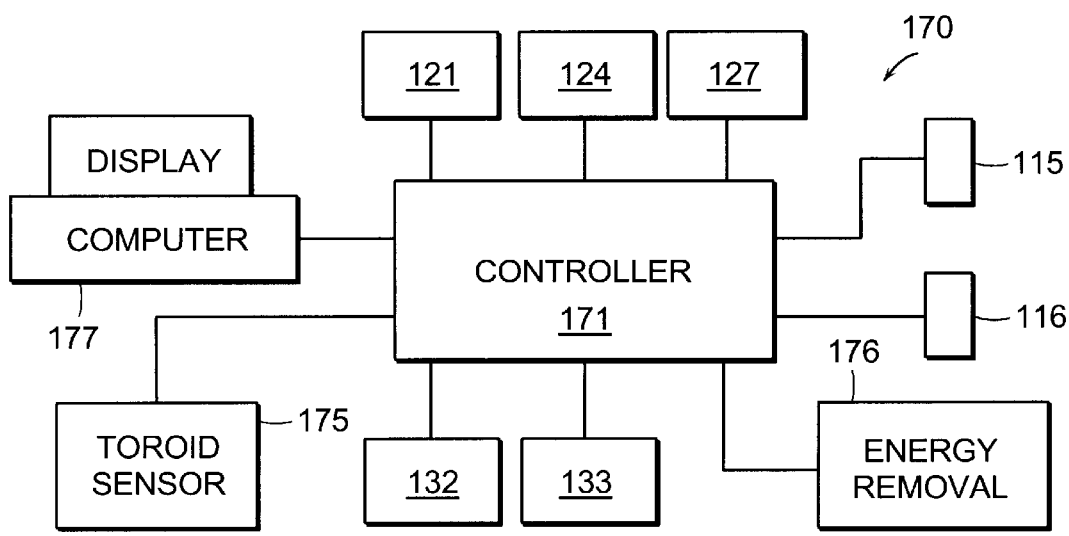
FIG. 17 is a schematic diagram of a control system to be used with the present energy storage system.

Control of the initiation and maintenance is done as shown in FIG. 17, which is a schematic diagram of a control system 170 to be used with the present energy storage system. A controller 171 sets the power supply voltages for the initiation of the toroid as described above with reference to FIG. 16. The initiating coil power supply 127 is turned on, then the filament voltage supply 121, then the grid voltage supply 124 incrementally to initiate the toroid. When the toroid is ready to self-sustain, the controller 171 turns off these supplies as required. Auxiliary fields 115 and 116 are used as required to establish the magnetic field.

A toroid sensor 175 senses the presence of the particles. This is done with a separate sensing coil. Energy removal circuits 176 are actuated as needed. A display computer 177 provides the operator with instructions, status, and manual control options.

Figure 18A:
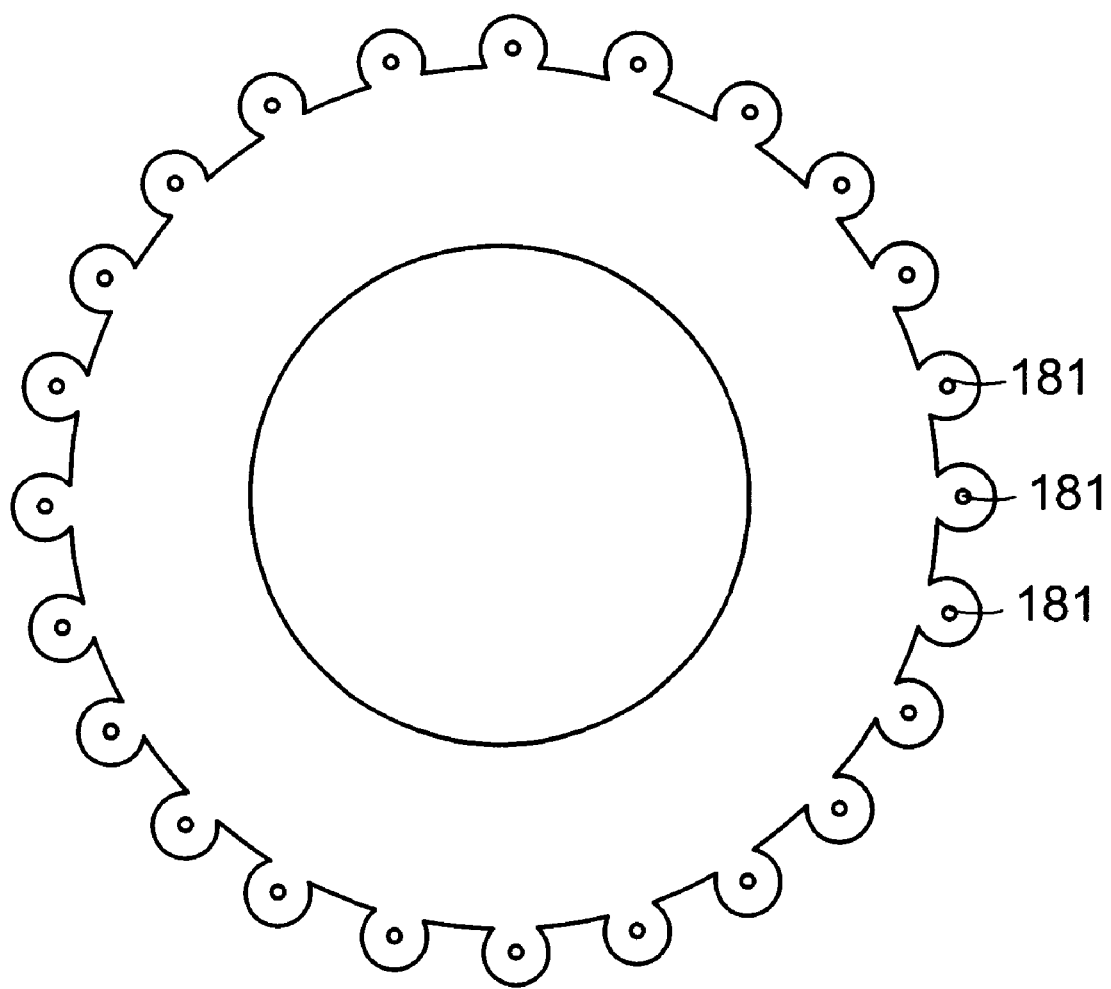
FIG. 18A is a schematic diagram of a vacuum chamber with a plurality of electron sources arrayed symmetrically about the chamber.

Electrons are sourced in many ways. The electron gun is a well-known approach and is shown in FIG. 14. In addition, a multiplicity of guns or sources can be used for the purpose increasing the amount of electrons initially injected to initiate the toroid. This is shown in FIG. 18A. Each gun has the elements and function shown in FIGS. 14 and 15. FIG. 18A shows many guns, 181, each injecting electrons. Initiating coils are not shown for clarity, but would be analogous to those illustrated in FIGS. 14 and 15.

Figure 18B:
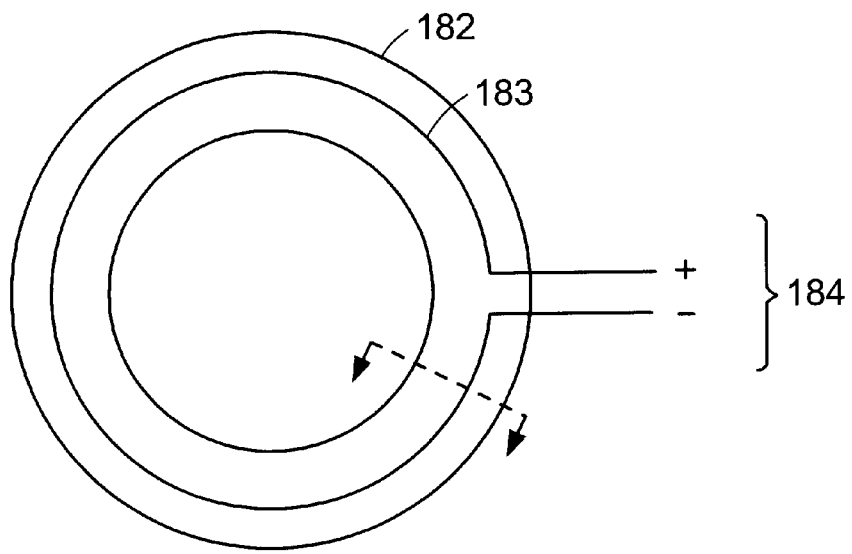
FIGS. 18B and 18C are schematic diagrams of top cross-sectional and indicated cross sectional views of a filament electron source.
Figure 18C:
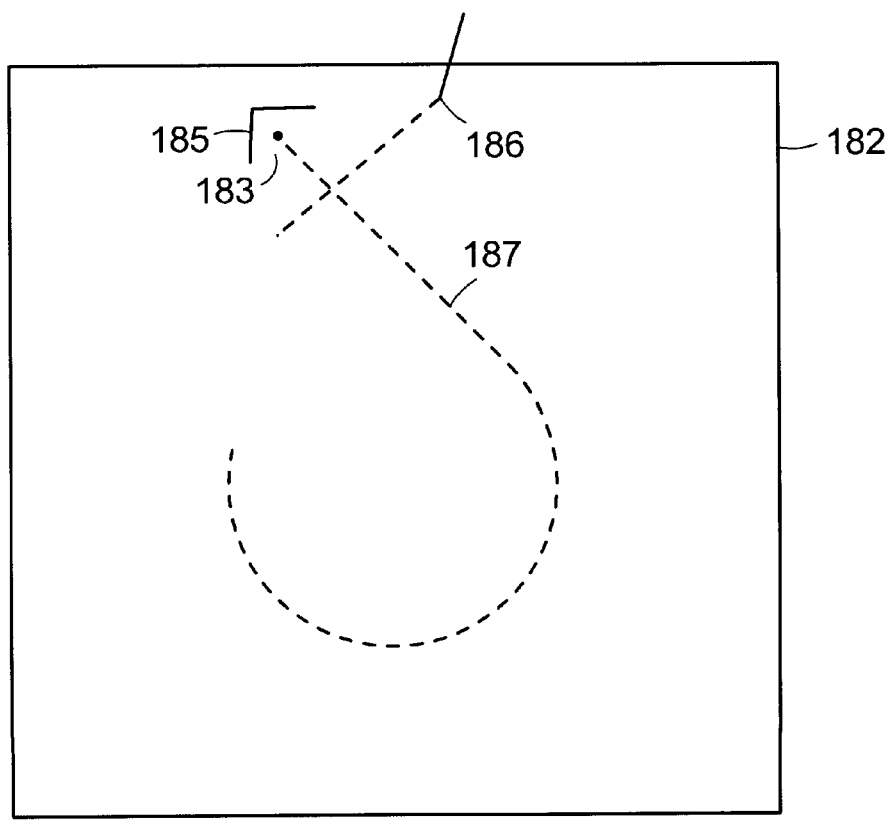

Another source of electrons can be a continuous filament or series of filaments extending completely around the vacuum chamber. FIG. 18A is a schematic diagram of a vacuum chamber with a plurality of electron sources arrayed symmetrically about the chamber. A continuous filament wire, 183, can also be used and is shown in the top cross-sectional view of FIG. 18B attached to one surface of the chamber, inside the coils (initiating coils not shown, for clarity). When power is applied to the filament leads 184 electrons are generated along the length of the filament. An electron shield 185 is supplied, as shown in FIG. 18C, which is appropriately biased to direct the electrons toward the grid 186. The grid accelerates the electrons which curve along the path 187 when the magnetic field is applied as described previously.

Figure 19:
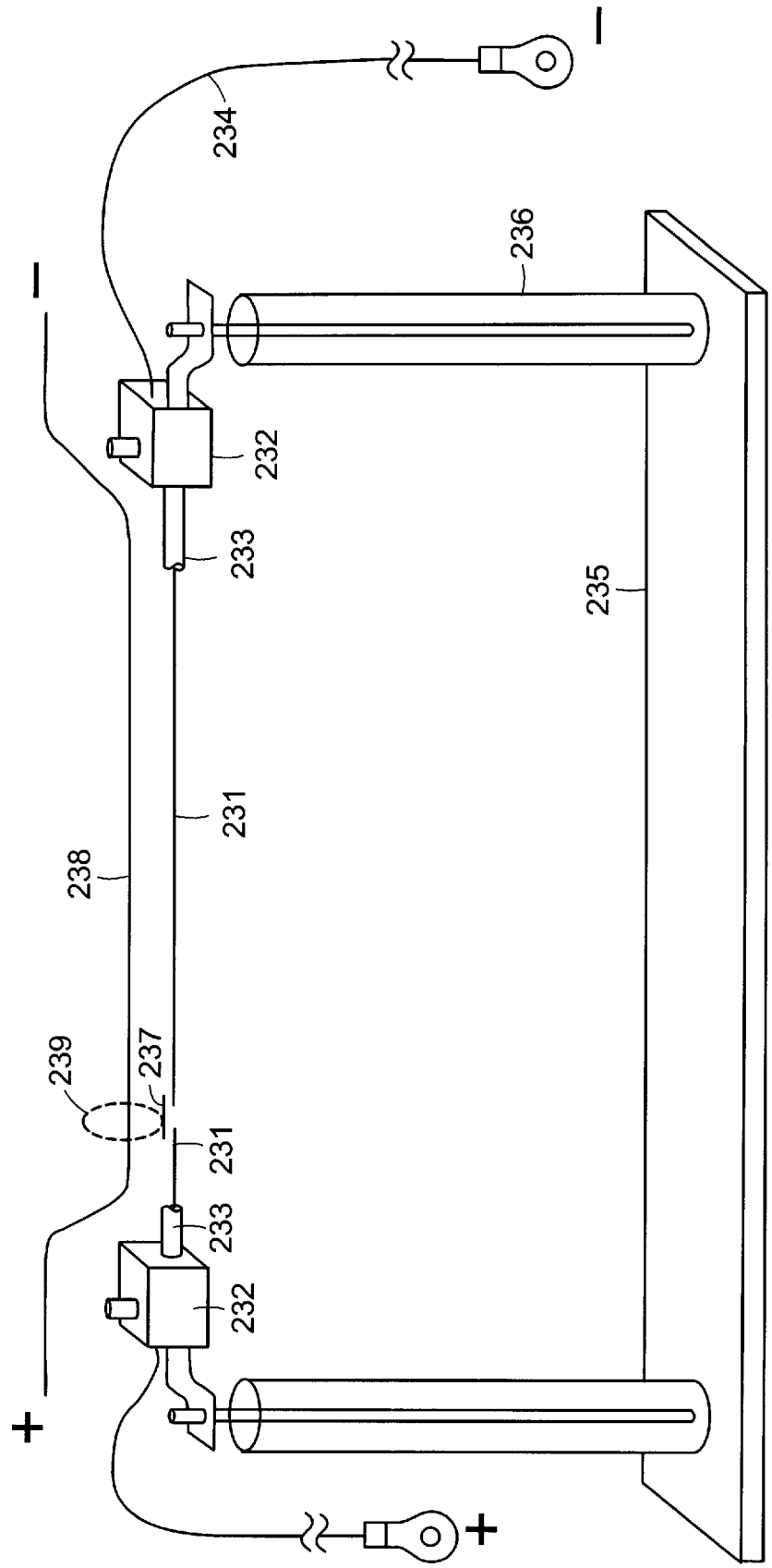
FIG. 19 is a schematic diagram of an electrode and single turn coil for initiating and containing an electron spiral toroid.

FIG. 19 is a schematic diagram of an electrode and single turn coil for initiating and containing an experimental electron spiral toroid. To achieve a high energy version of a toroid 239, a high energy electron beam source is needed. A high energy electrode includes of a pair of electrode wires 231 separated by a gap connected to two terminals 232 via larger wires 233. The electrodes are each in turn connected to a high current supply by suitable wires with connectors 234. The electrodes are mounted to a frame 235 consisting of a base and individual supports for the electrodes. The supports are insulated with tubing 236. Very fine wire 237 is soldered to the electrode wire across the gap between the two electrode wires 231.

A single turn coil 238 is spaced apart from the electrode wires 231 to create a circular magnetic field. The coil 238 can be either straight or a looped wire. In a preferred embodiment, the coil 238 is a brass rod spanning the gap between the electrodes 232. In particular, the brass rod 238 is about ⅓ cm in diameter and is separated from the electrode wires 231 by a distance on the order of 1 cm. The use of a solid rod ensures that the coil 238 is straight between the electrodes 232 so as to avoid electromagnetic field anomalies.

When a high current supply with high voltage is connected to the electrode, the fine wire 237 vaporizes quickly, heating the ends of the electrode wires 231, which in turn erode completely to the ends where they connect to the larger wire 233 at the electrodes 232. The electrons continue to flow through the gap from one electrode 232 to the other after the electrode wire 231 has eroded.

More specifically, a very thin wire on the order of AWG 38 is used. The electrode wire is AWG 22, although various sizes from AWG 24 to AWG 18 can be used. The larger wire at the electrode is AWG 10, to prevent excessive heating. At each wire interconnection, solder is applied to ensure good bonding. The electrodes are solderless lugs, with mechanical holding hardware. Insulation used is preferably PTFE (Teflon®) tubing.

The electrodes 232 are used in conjunction with the coil, or loop, 238. Once the electrode 232 has been connected for a time long enough to establish a beam in the gap, the coil 238 is turned on, creating a magnetic field which causes the electron beam to spiral around the wire. With the coil 238 remaining on, the beam forms the toroid 239. The coil 238 remains on, which contains the toroid 239. Once the toroid 239 forms, the electrode 232 can be turned off.

Timing of the initiation cycle is important. The electrode wire 231 has to be given enough time to erode fully, and to establish a plasma. This takes approximately 60 milliseconds. The coil 238 then can be turned on.

Also important is the field strength of the coil 238. If the field strength is too great, it will "blow out" the electrode, a well-known phenomenon associated with magnetic blow outs on mechanical relays. If the coil 238 is not strong enough, the beam will continue without spiraling. Typically, the electrode 232 can be initiated at 175 VDC, and 750 Amperes. The coil needs 750 amperes at a distance of 2.5 cm. Pressure can vary, but typically starts at less than 10,000 Pa, and more normally is between about 100–1,000 Pa.

If the electrodes are used without an initiating coil, free toroids can be generated. The toroids are "free" in the sense that they are not captured by a coil. By firing the electrode with typically 170 VDC, at a pressure of typically 1,000 Pa, free toroids will result. These have been observed to occur when the electrode has finished eroding, and the electron beam is in the process of extinguishing itself.

Figure 20A:
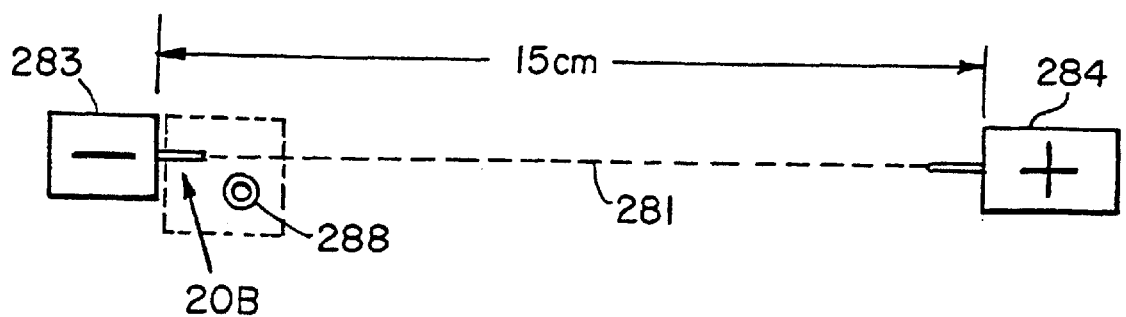
FIGS. 20A–20B are schematic diagrams of a method for generating small, uncaptured Electron Spiral Toroids in accordance with the invention.
Figure 20B:
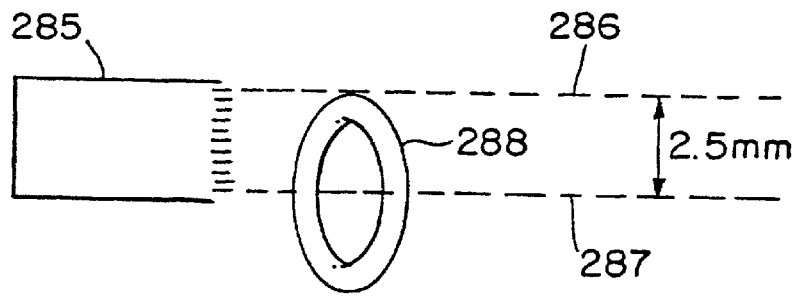

FIGS. 20A–20B are schematic diagrams of a method for generating small, uncaptured Electron Spiral Toroids in accordance with the invention. Referring to FIG. 20A, an electron beam 281 of approximately 600 amperes is established across a gap of approximately 15 centimeters. The electrons travel from a negative electrode 283 to a positive electrode 284. The pressure is approximately 1,000–10,000 Pa. Voltage between the electrodes is nominally 200 VDC, but can vary at least from 150 VDC to 500 VDC. The voltage and current are provided by a battery power supply.

The electrodes 283, 284 are composed of a stranded wire 285 (FIG. 20B), that is, they are made up of a number of wires. The surface is not smooth, but gives the beam many high points from which to depart. An enlarged view of the stranded wire 285 and electrode 283 is shown in FIG. 20B. A typical beam departs from a random point from the electrode, in a manner which parallels well known cathode activities. When the point of departure gets too hot, the beam jumps to a new point of departure, again, a well known cathodic phenomenon. During this jump, there is a period of time where the first beam is decaying and in the process of stopping, and a second beam 287 is building up. The second beam establishes a magnetic initiating field as described above, and just as the first beam extinguishes, the first beam is captured in the initiating field. The result is a small EST 288.

The toroids have been initiated at pressure ranging from 1 Pa to over 10,000 Pa, at voltages from 80 VDC to over 500 VDC and with currents measured from 200 amperes to 1300 amperes. The toroids observed are measured to be approximately 5 millimeters in diameter, with an orbit diameter of 1.5 millimeters. The toroids are similar to the general shape shown in FIG. 13, and have a smooth surface.

Figure 21:
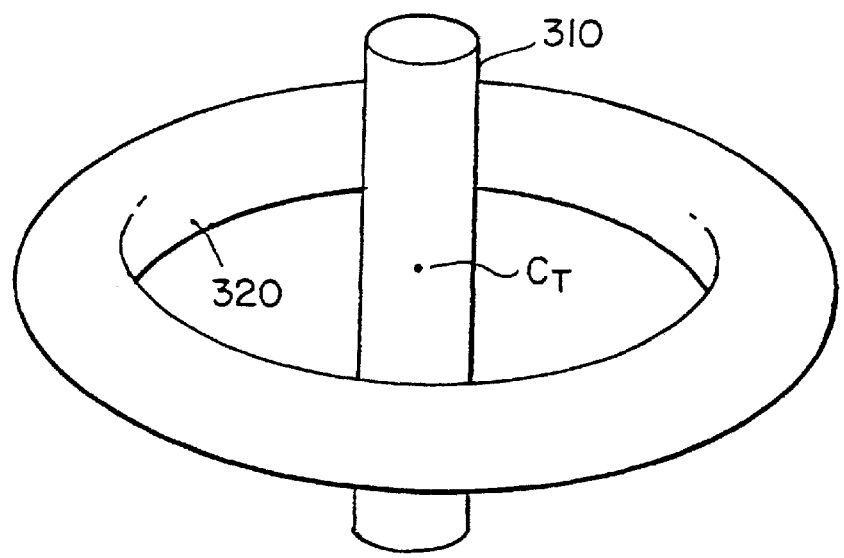
FIG. 21 is a schematic diagram of a charge accumulator for neutralizing the charge of the toroid.

FIG. 21 is a schematic diagram of a charge accumulator for neutralizing the charge of the toroid. When electrons are used, the toroid orbit is a configuration of electrons in orbit. The total charge of the toroid can be a problem for containment of the toroid. A charge accumulator 310 is centrally located relative to the toroid and holds an equal and opposite charge to the charge of the toroid for neutralizing the charge of the toroid. To an outside observer, the charge of the toroid appears to be all residing at the center of the toroid $C_T$. Theoretically, a total charge of opposite sign located at the toroid center $C_T$ will neutralize the toroid charge. If ions equal to the number of electrons are located at the center of the toroid $C_T$, the charge can be neutralized, allowing containment of the toroid 320.

The charge cannot practically be accumulated as a point charge. However, it can be located in a charge accumulator 310 as long as the charge accumulator is symmetrical to the toroid. The location of the charge accumulator 310 must be such that its center is located at the center $C_T$ of the toroid 320. Locating it central to the toroid 320 is not difficult, because the charge of the toroid itself seeks to minimize forces and thus seeks to centralize itself on the charge accumulator 310. The charge accumulator 310 can be in any number of shapes, including but not limited to a sphere, a cylinder, a disc, or any complex shape that is symmetrical about the central axis. The dimensions need to be less than that of the central opening of the toroid 320.

Alternatively, the charge of the EST can be neutralized by generating an image charge on a metal conductor at the center of the toroid $C_T$.

Energy can be added to an EST by the application of microwave power. This can be appropriate if the EST has been initiated in a lower than required energy state, thus requiring added power to increase the stored energy of the EST. Another possibility is to simultaneously initiate the EST by one method, such as electron beam injection, while providing additional energy using a microwave source to make the electron beam more energetic.

Microwave power is an attractive technique for adding energy because the cost is low and the power is easily transmitted into the EST and across the magnetic field lines. Microwave beams can be sent into the vacuum vessel of the torus through standard ceramic windows. Therefore, the coupling-in of the microwave power is simple from an engineering point of view. Microwave power is currently used to add energy to electron beams in two well known applications: radio frequency (RF) electron accelerators and plasma heating.

In accelerators, the coupling of the microwaves to the electron beam is carried out in cavities or traveling wave structures held at ultra-high vacuum. The coupling requires synchronism or matching between the velocity of the electron beam and the phase velocity of the microwaves. The microwave cavities provide the conditions for achieving the synchronism condition. These conditions can also be achieved in the EST configuration by having a microwave cavity or cavities surround the EST. Microwaves are also used to heat plasmas, both high temperature plasmas of interest for fusion research as well as small laboratory plasmas used in making layers and coatings in the semiconductor industry.

In applying microwave energy to the EST, it is desirable to achieve conditions similar to those in an electron accelerator where the rate of energy increase is about the same for all electrons. In this way, the electrons are maintained as a coherent group. The electrons can be accelerated in cavities. Another possibility is to accelerate the electrons at the electron cyclotron resonance condition (with or without a cavity). This approach is called electron cyclotron resonance heating (ECRH).

In ECRH, the electrons are accelerated in the direction transverse to the applied magnetic field. The electron cyclotron resonance condition is given by:

$$\omega_c = eB/Im$$

where:
$\omega_c$ is the electron cyclotron frequency in radians/second;
e is the electron charge;
m is the electron mass; and
B is the magnetic field.

For example, using a 1 GHz microwave source, the required magnetic field for electron cyclotron resonance is 360 Gauss (0.036 T).

Use of electron cyclotron resonance heating assures that energy was added to the transverse component of the electron beam velocity distribution. This has advantages in allowing the conditions for EST equilibrium to be achieved. However, it is also possible to independently add energy to the motion in the toroidal direction. This could be done using a microwave cavity structure.

Energy Removal

The EST includes an electron orbit which can hold electrons in place for long periods of time. Once an EST is established, it contains energy in the form of electron kinetic energy and magnetic field energy in the EST internal magnetic field. The EST has several properties which make it an effective energy storage device. For example, the EST can store large amounts of charged particles of the same charge. The EST can also store high energy particles.

Energy removal can be done in several ways. The first method utilizes energy removal by collisions. When particles approach the toroid, they are repelled electrostatically, absorbing energy in the process. By valving open the vacuum chamber and allowing increases in the number of particles, energy is removed from the toroid by the collisions. The heated particles can be removed from the vacuum chamber in a controlled manner for use of the heat energy elsewhere.

The geometry of the toroid is such that all the electrons work together to repel gas molecules. Collisions with gas molecules are collective, so all electrons remain in orbit during and after a collision. The electrons lose kinetic energy when repelling an incoming molecule.

As a gas molecule approaches the toroid, the gas molecule encounters a surface of charge; not individual electrons. Each incoming molecule is electrostatically repelled by the surface charge as an elastic collision. This is possible because of the geometry of the toroid. Each electron in orbit has restoring forces that hold it in place. These forces also transfer energy between electrons. Thus each repulsion of a gas molecule takes energy from the toroid as a whole, not from a single electron. The toroid endures until enough collisions have occurred that there is not sufficient energy to repel colliding molecules. At that time collisions knock electrons out of orbit, eventually ending the EST.

The energy in an EST with 100 coulombs of charge and 25,000 volts per electron is 2.5 megajoules. Energy removal from the EST can be accomplished by controlling the pressure. The rate of energy removed is thus directly proportional to the pressure of the atmosphere around the EST.

A second method discharges all or parts of the electrons in the toroid by altering the local magnetic field. By introducing a local magnetic field near the toroid, the magnetic field of the toroid is overcome at one point. This causes electrons to shoot out in one beam and hit a target. This can also be done using a local electric field.

Figure 22:
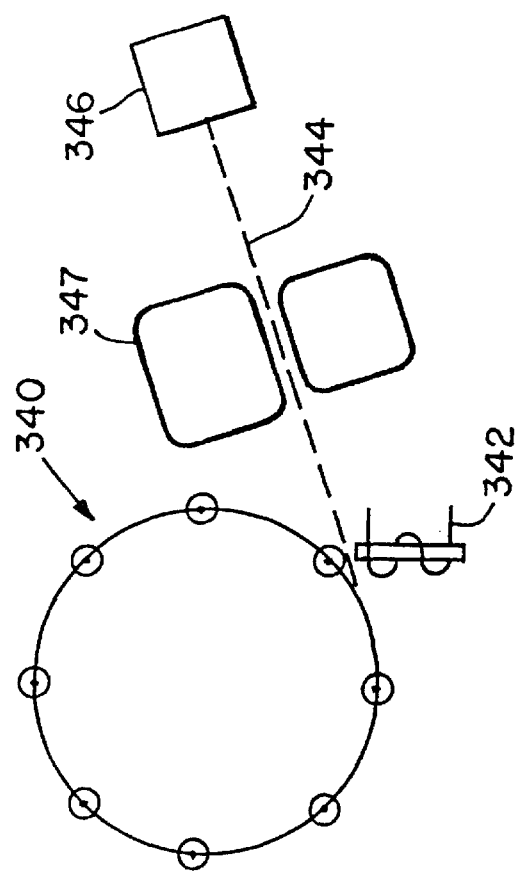
FIG. 22 is a schematic diagram of a local field system for removing charge from the toroid.

FIG. 22 is a schematic diagram of a local field system for removing charge from the toroid. A typical orbit is shown schematically as 340. A local electromagnet 342 can be operated to create a local field great enough to overcome the magnetic field of the toroid. When this condition exists, electrons form a beam 344 tangentially to the orbit. The electrons collide with a target 346, and in doing so transfer their energy. The length of duration of the local magnetic field determines how many electrons are diverted. Once the electrons have been removed from the EST, they can be directed past coils 347 where they induce a voltage, which in turn can be used for power generation, using well known technology. By switching the electromagnet 342 on and off, packets of electrons can be diverted to generate AC power.

A local field system for energy removal can provide an energy conversion efficiency of about 95%. As such only about 5% of the energy being converted is lost as waste, which typically manifests itself as thermal energy. In certain applications, such as military vehicles, the losses can be below background levels. Unlike traditional vehicles, which generate infrared signatures that can be detected, vehicles in accordance with the present invention can maneuver without generating an infrared signature detectable over background noise.

Figure 23:
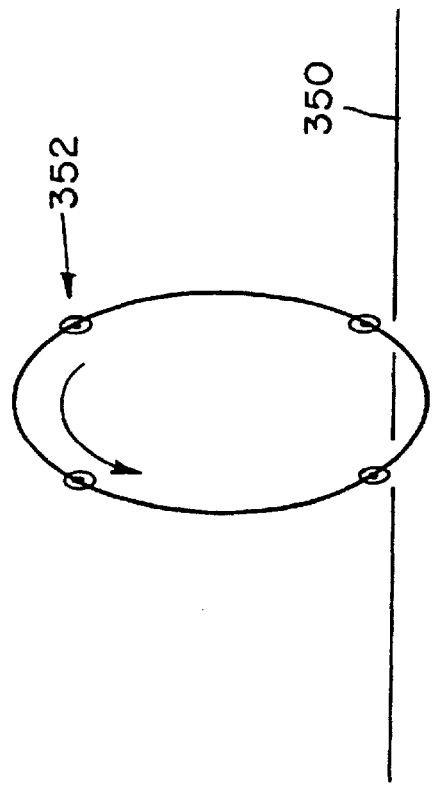
FIG. 23 is a schematic diagram of a system for removing charge by magnetic induction.

A third method for removing the energy is through magnetic induction. FIG. 23 is a schematic diagram of a system for removing charge by magnetic induction. The electrons in the toroid travel in a fixed orbit. As shown, placing a magnetic pick-up 350 near the orbit will cause an induced voltage in the pick-up as the pick-up senses electrons passing 352. The magnetic pick-up 350 is a well-known device such as a coil or a wire which will cut magnetic field lines and cause a voltage to be created on the wires of the coil or on a single wire. The pick-up functions as does a stator in an electric generator to produce voltage and current induced by the electrons.

A fourth method disclosed for removing energy is through thermal electric generation. The toroid location can be altered by external fields. Using external magnetic and electric fields, the toroid can be moved closer to a surface, causing heating of the surface. Existing technology can be used to generate electricity from the heated surface.

Figure 24:
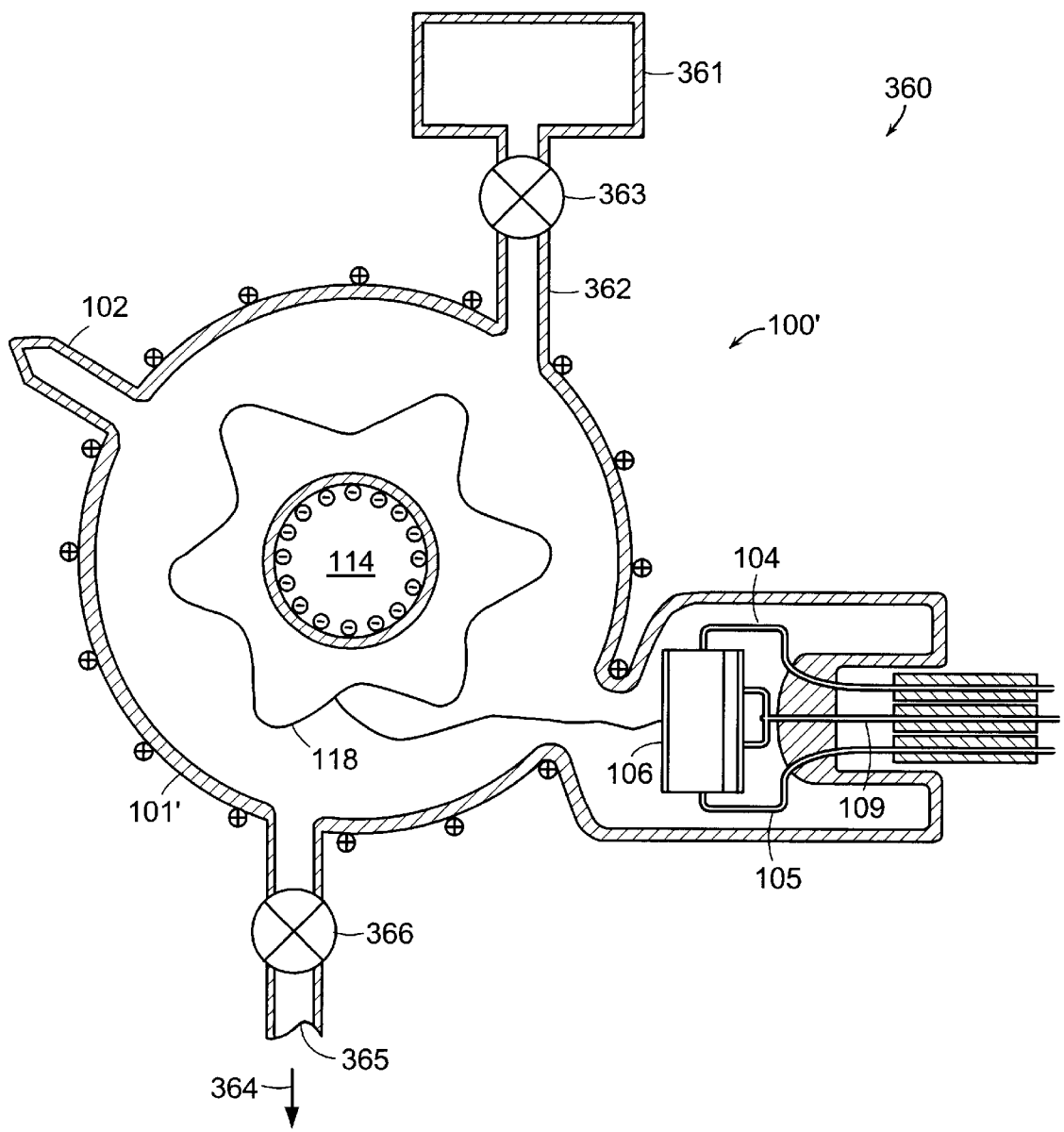
FIG. 24 is a schematic diagram of a system for removing energy from a vacuum tube system using a gas flow system.

FIG. 24 is a schematic diagram of a system 360 for removing energy from a vacuum tube system 100' using a gas flow system. A gas supply 361 of inert gas is attached to the vacuum housing 101' via piping 362 with an inlet valve 363. Opening the inlet valve 363 and controlling the rate of gas flow injects gas into the housing 101'. The gas causes elastic collisions with the toroid and gains heat. Hot gas 364 exits an outlet 365 having an outlet valve 366 similar to the inlet valve 363. The electron plasma toroid loses energy as it repels gases. Normal precautions need be taken to provide for pressure safety relief (not shown here).

Figure 25:
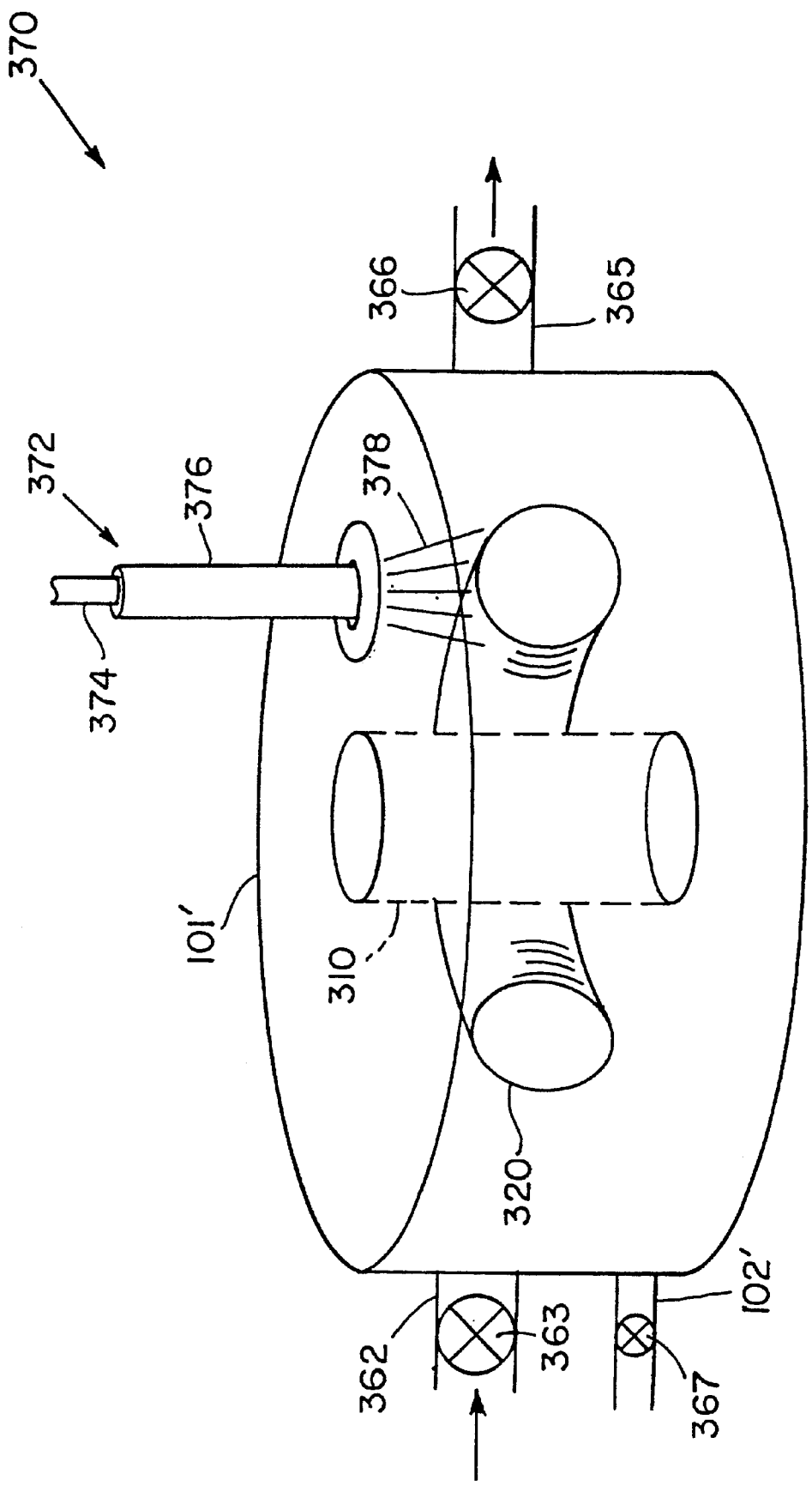
FIG. 25 is a schematic diagram of a microwave recharger for the gas flow system of FIG. 24.

FIG. 25 is a schematic diagram of a microwave recharger 372 for a gas flow system of FIG. 24. A microwave source 376 such as a microwave tube, similar to those found in microwave ovens, is connected to, or mounted directly onto the vacuum enclosure 101' of the system 370. Power is applied to the microwave source 376 using a power feed 374. The microwave source 376 converts the power into microwave energy 378 which is used to illuminate the electrons. A typical microwave source can supply one kilowatt of microwave energy, but can be scaled upward to supply more to provide a faster recharge rate. Also illustrated is a control valve 367 for the vacuum port 102'.

Electrical Power Generators

Once a toroid is established, and energy is stored therein, the toroid can be used in conjunction with a thermalelectric generator or thermalchemical generator. The physics of these devices is well known, and will not be detailed here. An example of a thermalelectric device is a flat plate thermopile from Global Thermoelectric Company. An example of a thermalchemical generator is an AMTEC cell from Advanced Modular Power Systems, Inc. which uses a liquid sodium cycle to generate electricity.

Each of these generators requires a heat source. The requisite heat can be generated from the electron spiral toroid. Using the hot gas generator 360 described in FIG. 24, heated gas can be applied directly to the thermalelectric or thermalchemical device to generate electricity.

The energy stored in the toroid can also be used in conjunction with a magnetohydrodynamic (MHD) system to generate electricity. The MHD technology is well known, but not used in portable applications due to a lack of a portable high energy power source. The plasma toroid can provide this portable power source.

MHD systems are in wide use throughout the world. References which explain the MHD system are "Magnetohydrodynamic Energy for Electric Power Generation" by Robert F. Grundy, and McGray Hill's "Engineering Magnetohydrodynamics," by George Sutton. MHD systems are compact, simple, and have a high power density, which make it very attractive for portable applications. Although a complete MHD system design is not provided herein, every MHD system needs a high temperature heat source, and a heat source for the MHD system is now described.

Figure 26:
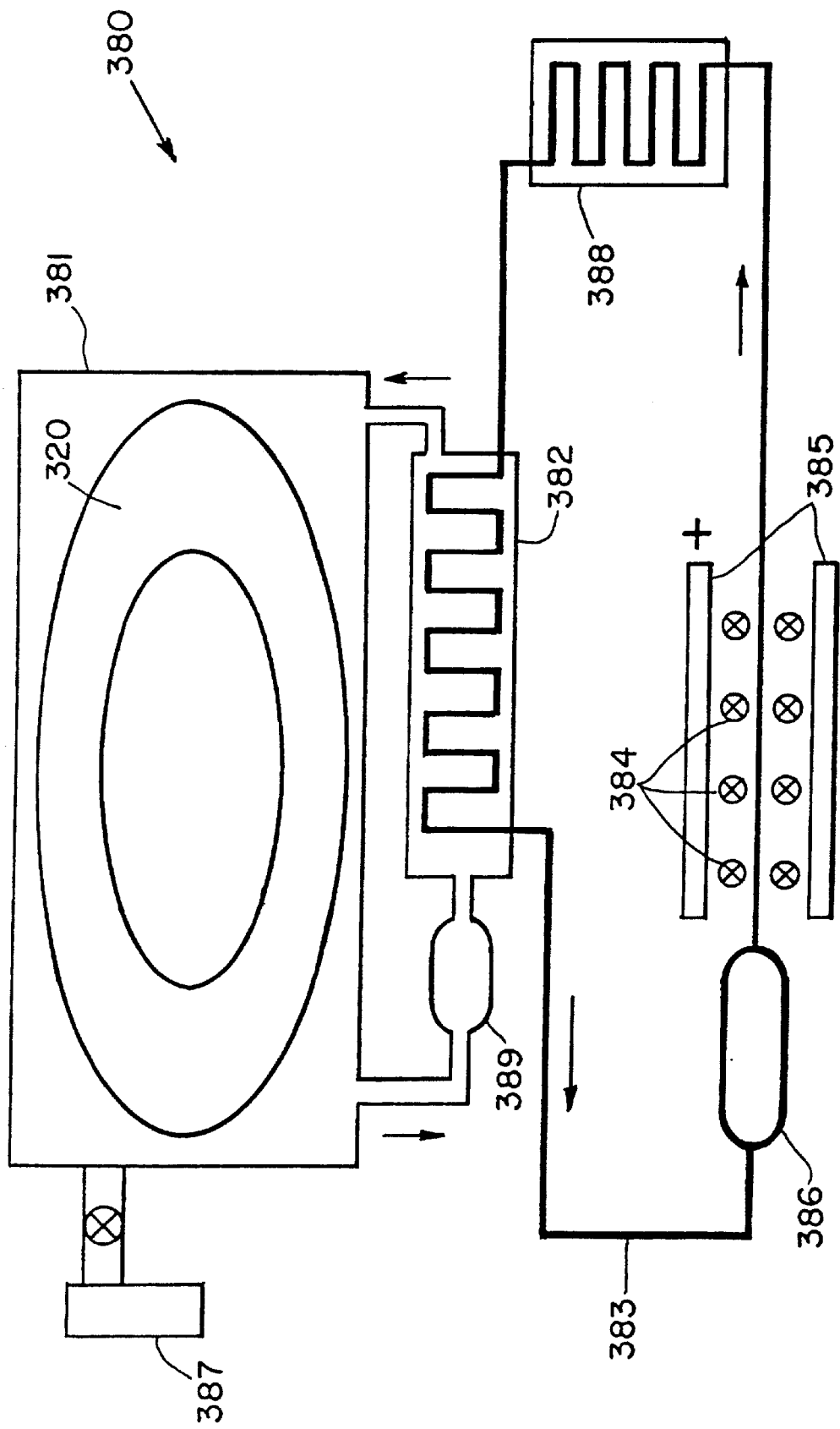
FIG. 26 is a schematic diagram of a magnetohydrodynamic system for converting removed heat energy into electric power.

FIG. 26 is a schematic diagram of an MHD system 380 for converting energy from the toroid into electrical energy. A plasma toroid 320 is contained in a housing 381 with a controlled atmosphere. The atmosphere is controlled by a gas supply shown schematically as 387. The gas is heated by the toroid 320, similar to the energy removal described above and illustrated in FIG. 24. By controlling the pressure and temperature in the housing 381, energy is removed from the toroid 320 as required. The gas used here is preferably carbon dioxide or a similar gas which can be heated to 3000K and above without ionizing. Ionizing needs to be avoided to ensure long life for the toroid 320.

For an MHD system 380, it is necessary to generate an ionized MHD gas 383. This can be done by using nitrogen or hydrogen or any of a number of similar gases and seeding it with an alkali metal such as potassium to ensure ionization at a relatively low temperature of 2500K. To generate the MMD gas 383, the gas from the toroid housing is moved by a pump 389 or similar mechanism through a heat exchanger 382 to heat the MMD gas 383. In this way, the MHD gas is heated and ionized, but the toroid housing gas remains non-ionized. The heat exchanger is well-known technology used in high temperature heat exchangers, and is not further detailed herein. The high temperatures are accommodated by building the heat exchanger of a heat tolerant metal such as titanium.

The MHD gas is moved by a pump 266 or nozzle assembly. The MHD gas 383 passes through an MHD magnetic field 384, which can be generated by permanent magnets (not shown). The movement of the ionized gas through the magnetic field causes the ions and electrons to move to the opposite electrodes, thus generating electricity at MHD electrodes 385. The MHD gas 383 is moved through a radiator 388 to cool, then through the heat exchanger 382 to repeat the cycle.

Equilibrium Properties of Electron Spiral Toroids

The equilibrium properties of the Electron Spiral Toroid have been calculated using the Vlasov-Maxwell linetic theory. This theoretical approach is necessary to correctly treat the thermal effects of the electron plasma in a self-consistent fashion. In this approach, the particle (electron) distribution function is given by the function f:f($\bar{x},\bar{p}$,t), where f is a function of real space ($\bar{x}$), momentum space ($\bar{p}$) and time (t). In a nonrelativistic theory, velocity space, ($\bar{v}$), can be used instead of momentum space. The particle distribution function evolves self consistently under the influence of the average electric field, $\bar{E}(\bar{x},t)$ and magnetic field $\bar{B}(\bar{x},t)$. The solution of the time evolution of the particle distribution is given by the combination of the well-known Maxwell equations of electromagnetic theory and the Vlasov equation of plasma kinetic theory. The Vlasov equation is given by:

$$\left\{ \frac{\delta}{\delta t} + \bar{v}\frac{\delta}{\delta x} + e(\bar{E} + \bar{v} \times \bar{B})\frac{\delta}{\delta p} \right\} f(\bar{x}, \bar{p}, t) = 0$$

In this equation, the particle position is given by x, the particle velocity by $\bar{v}$, the particle charge by e (the charge of the electron), the particle momentum by $\bar{p}$. The distribution function f is normalized so that its integral over real space and momentum space yields a value of unity (one). This kinetic model must be used to accurately treat the self consistent time evolution of an ensemble of particles which interact with one another through electric and magnetic forces. The Vlasov-Maxwell equation approach is discussed in standard plasma physics textbooks. These equations assume that the particles interact through the average fields as a collisionless nonneutral plasma; collisions can be treated by an extension of this theory so long as they are a relatively weak influence.

These calculations provide a rigorous model for the electron spiral toroid.

Model Description

The model includes a toroidal geometry with the interaction space defined as a torus of major radius $r_t$ and minor radius a. The coordinate system is chosen as a cylindrical coordinate system with a toroidal axis, z, a distance along the major radius, r, and an angle θ around the toroidal direction.

The magnetic field in this case is given by:

$$\overline{B} = B_o(r_t)\frac{r_t}{r}\overline{e}_\theta$$

where the magnetic field points around the torus and falls off as the reciprocal of the distance r along the major radius. The "aspect ratio" is considered to be small: $a/r_t \ll 1$.

The electron density is assumed to be given by:

$$n_b(r) = \begin{cases} r_{bl}\hat{n}_b/\rho & \text{if } r_{bl} < \rho < r_{b2} \\ 0 & \text{otherwise} \end{cases}$$

where $r_{b1}$ and $r_{b2}$ are the inner and outer minor radii of the electron spiral toroid and $r_{b2}$ must be less than the minor radius of the toroidal chamber, a.

The constant $\hat{n}_b$ is defined implicitly in terms of the total number of particles (see below). The distance $\rho$ of a particle from the major axis $r_t$ is given by;

$$(r-r_t)^2 + z^2 = \rho^2$$

$$r_{b1} \leq \rho \leq r_{b2}$$

$$\rho \ll r_t$$

The total number of electrons in the electron spiral toroid (EST) is given by $N_b$ where:

$$N_b = (2\pi)^2 r_t \int n_b(\rho)\rho d\rho$$

The electron motion is assumed to be nonrelativistic. A background ion density is introduced in the region of the electron spiral toroid. The density is considered to be a constant over the electron volume and the ion density $n_i$ is given by:

$$n_i = \frac{fN_b}{2\pi^2 r_{b2}^2 r_t}$$

where $f = N_i/N_b$ is a constant and $N_i$ is the total number of ions inside the electron spiral toroid.

Another assumption is that the ions are at rest and have a single positive charge. This assumption is valid because the ions are heavy and their motion is not a significant correction to the electron equations of motion. In the above assumptions, a number of different limiting cases may be obtained. For example, it is assumed that there is an externally applied magnetic field, $B_0$. However, the value of the parameter $B_0$ can be equal to zero. In that way, the case of zero externally applied magnetic field, an important case can be treated. The electrons are defined to have a range in radius between $r_{b1}$, the inner radius, and $r_{b2}$ the outer radius. If the limiting case $(r_{b2}-r_{b1})$ goes to zero, the case of an ideally thin electron spiral toroid can be treated. The case of no ion background may also be treated by allowing the ion density to go to zero in the above equations.

Characteristics of the Solutions

The nature of the solutions to the Vlasov-Maxwell equations outlined above will now be summarized. The method of solution involves the use of Hamilton's equations for the particle motion. This method provides a set of equations for the time dependence of the canonical angular momentum. It also directly yields the constants of the motion (if any) for the particles. For this case, these constants are i) energy (H) which is a constant of the motion, ii) canonical angular momentum, Pa, which is a constant where:

$$P_\theta = r[p_\theta - eA_\theta^s(r,z)] = \text{constant}$$

and iii) the "poloidal" canonical angular momentum, $P_\phi$, which is approximately constant in the limit of a large aspect ratio (i.e. $r_{b2} \ll r_t$), where:

$$P_\phi = p\left\{P_\phi - \frac{e}{2}[B_0(r_t) + B_\theta^S(r_t, 0)]\rho\right\} \cong \text{constant}$$

where:

$\rho$ is the radial distance measured from the minor axis of the torus;

$p_\theta$ is the mechanical momentum in the toroidal direction;

$A_\theta^s$ is the vector potential due to the self fields of the electron and ion distribution;

$p_\phi$ is the momentum in the $\phi$ direction about the minor axis; and $B_\theta^s$ is the magnetic self field in the $\theta$ direction.

The equilibrium solutions of the Vlasov-Maxwell equations may be obtained using boundary conditions and the above three constants of the motion.

The general solution of any set of equations allows a wide variety of special cases. In general, useful results can only be obtained if the solutions are restricted in some way, such as to a particular regime of operation. A few general remarks can be made. A finite number of residual ions can be shown to be necessary for an equilibrium. This arises because the electrons drift along the toroidal axis z unless there is a restoring force. Such a force can be provided by ions. Alternatively, a positive electrode can act to confine the electron toroid vertically (along z). This can eliminate the need for an ion background.

The present analysis, however, assumes the presence of an ion background. The ion background density $n_i$ should be equal to or greater than the electron density $n_e$ for confinement in most cases. Radial confinement can also be helped by the presence of an ion background. The ion background can be a natural constituent of the electron spiral toroid if it is initiated in a neutral gas atmosphere. It can also come about through an ionization process after the formation of an initially nonneutral (that is negatively charged) electron spiral toroid in the presence of a background gas. That background gas can be introduced intentionally or as a result of natural impurities.

Kinetic Hollow Electron Spiral Toroid Equilibria

The Vlasov Maxwell equations have been solved for self-consistent equilibria of the electron spiral toroid. Self-consistent, is defined herein as the self electric and magnetic fields of the spiral toroid calculated and included in the particle equilibrium calculations. The presence of an ion background is also included.

Assumptions for these calculations are given above. They include the presence of an ion background, nonrelativistic motion of the electrons, ions that remain at rest and an applied toroidal magnetic field $B_0$. The electron spiral toroid is assumed to occupy a thin ring at radii bounded by $r_{b1}$, the inner radius, and $r_{b2}$, the outer radius, each of which is very small compared with the toroidal radius, $r_t$. The details of the calculation are lengthy and are only summarized here. The results for two cases are considered: a zero applied magnetic field and a finite applied magnetic field, $B_0$.

Free Hollow Electron Spiral Toroid Equilibria, $B_0=0$.

In terms of the conserved quantities $H_0$ and $P_\phi$, the solution for the inner radius, $r_{b1}$, of the spiral toroid and the outer radius, $r_{b2}$ can be written as:

$$r_{b1} = \frac{|P_{\phi 0}|}{(2mH_0)^{1/2}}\left(1 - \frac{r_e N_b}{2\pi r_t}\right)$$

$$0 = 1 - \left(\frac{r_{b1}}{r_{b2}}\right)^2 \left[1 - \frac{\omega_p^2 r_{b1}^2}{2c^2}\left(\frac{r_{b1}}{r_{b2}} - 1\right)\right]^{-2} -$$
$$\frac{f}{2}\left(\frac{m\omega_p^2 r_{b1}^2}{H_0}\right)\left(\frac{r_{b1}}{r_{b2}}\right)^2 \left(\frac{r_{b2}^2}{r_{b1}^2} - 1\right) +$$
$$\left(\frac{m\omega_p^2 r_{b1}^2}{H_0}\right)\left(\frac{r_{b2}}{r_{b1}} - 1 - \ln\frac{r_{b2}}{r_{b1}}\right)$$

which is characterized by three parameters:

$$f = \frac{N_i}{N_b}, \quad \frac{\omega_p^2 r_{b1}^2}{c^2}, \quad \text{and} \quad \frac{H_0}{mc^2}$$

The number of electrons in the electron spiral toroid is given by $N_b$, where:

$$N_b = \pi\left(\frac{\omega_p^2 r_{b1c}^2}{c^2}\right)\left(\frac{r_t}{r_e}\right)\left(\frac{r_{b2}}{r_{b1}} - 1\right)$$

and where $r_e$ is equal to $2.8 \times 10^{-15}$ m and $\omega_p$ is the plasma frequency.

Hollow Electron Spiral Toroid Equilibria in an Externally Applied Field, $B_0$.

In this case, the solution is given by:

$$\frac{r_{b1}}{r_b} = 1 - \left(1 - \frac{2P_{\phi 0}}{m\Omega_0 r_b^2}\right)^{1/2}$$

$$0 = \left(\frac{r_b}{r_{b1}}\right)^2 - \left[\left(\frac{r_b}{r_{b1}} - \frac{1}{2}\right)\left(\frac{r_{b1}}{r_{b2}}\right) + \frac{1}{2}\left(\frac{r_{b2}}{r_{b1}}\right)\right]^2 -$$
$$\frac{f\omega_p^2}{\Omega_0^2}\left(\frac{r_{b1}}{r_{b2}}\right)^2 \left(\frac{r_{b2}}{r_{b1}} - 1\right)\left[\left(\frac{r_{b2}}{r_{b1}}\right)^2 - 1\right] +$$
$$\frac{2\omega_p^2}{\Omega_0^2}\left(\frac{r_{b2}}{r_{b1}} - 1 - \ln\frac{r_{b2}}{r_{b1}}\right)$$

which is characterized by the three parameters:

$$f = \frac{N_i}{N_b}, \quad \frac{\omega_p^2}{\Omega_0^2}, \quad \text{and} \quad \frac{r_b}{r_{b1}}$$

The quantity $\Omega_0$ is the electron cyclotron frequency given by $eB_0/m$. The number of electrons stored in the electron spiral toroid is given in this case by:

$$N_b = 2\pi\left(\frac{\omega_p^2}{\Omega_0^2}\right)\left(\frac{r_t}{r_e}\right)\left(\frac{r_{b1}}{r_{b2}}\right)^2\left(\frac{r_{b2}}{r_{b1}} - 1\right)\frac{\langle v_\phi\rangle^2(r_{b1})}{2c^2}$$

where $$\frac{\langle v_\phi\rangle^2(r_{b1})}{2c^2}$$

is the ratio between the electron kinetic energy transverse to the toroid at $\rho = r_{b1}$ and the electron rest energy of 511 keV.

Theoretical Conclusions

The rigorous equations describing the equilibrium of a distribution of particles, the Vlasov-Maxwell equations, have been solved for the case of an electron spiral toroid. These solutions indicate that under very general conditions equilibria do exist for two separate cases: an electron spiral toroid with no externally applied magnetic field and an electron spiral toroid with an externally applied magnetic field. A background ion distribution can be used to stabilize the electron spiral toroid against motion along the toroidal axis. The case of a thin, hollow ring was solved in detail either with or without an applied external magnetic field, the stored charge distribution was calculated in terms of the conserved quantities: the energy and the canonical angular momenta. These calculations allow estimates to be made of the stored charge and energy in the electron spiral toroid.

The conditions of the nonneutral plasmas differ from those of the electron spiral toroid (EST). In the EST, the energy stored per particle can be about 100 volts, preferably in the range from several hundred Volts up to at least 25,000 Volts. Above about 25,000 Volts, x-rays are generated in a narrow energy band from a non-radioactive source. The width of energy band is dependent on the differences in velocity of the particles in the orbits.

The number of particles per unit volume for 10,000 Coulombs of charge stored in a 0.1 m³ volume is $6 \times 10^{23}$ (m⁻³), much larger than in the nonneutral plasma examples. The plasma frequency in the EST can exceed the cyclotron frequency for any magnetic field of interest (less than 10 kGauss). The energy density in the EST can exceed that in a conventional nonneutral plasma by at least one order of magnitude and preferably by many orders of magnitude. Indeed, for the EST it is desirable to store the maximum possible energy per unit volume.

For traditional plasmas, the ratio $$\left(\frac{\omega_p}{\Omega_0}\right)^2$$

is limited to less than 1. This is shown in "Physics of Nonneutral Plasmas", by R. Davidson, Addison-Wesley. This implies that the total number of charged particles is limited by the strength of the applied external magnetic field. In the EST, this ratio is reversed. The retro $$\left(\frac{\omega_p}{\Omega_0}\right)^2$$

can be much greater than one, and ratios have been calculated to be as high as 500. This suggests the total charge that can be stored in the EST can be great.

The Electron Matrix Shell of the Electron Spiral Toroid

The Electron Spiral Toroid has a thin outer shell of electrons. This occurs because during formation, the electrons rotate in the applied magnetic field. As they rotate, electrons with nearly identical energy move to a nearly identical orbit radius. Thus orbit levels of electrons form, each having electrons of nearly identical energy. Electrons with higher energy migrate to a level higher than electrons with lower energy.

As the rotation of the electrons continues, migration occurs as electrons seek their energy level. This can be thought of as rotational filtering. Eventually, the energy of electrons in a level become close.

When the energy between adjacent electrons is close enough, and if the density of the electrons is high enough, the electrons couple into a matrix. Many matrices form, one for each energy level. The total of these matrices form the EST outer shell. The overall thickness of the outer shell is not great because the orbit differences of matrices are close.

The condition for electron matrices is well known, and is defined as the coupling factor $\Gamma$.

The coupling factor for a matrix is:

$$\Gamma = (1/k_B T)(q^2/4\pi\epsilon_0)[4\pi n_b/3]^{1/3}$$

where:
T is the difference in energy between electrons; and
$n_b$ is the electron density.

It is important to note that T relates to the difference in energy, and not to the absolute energy, because much of the work to date on electron matrices has been done near absolute zero.

Two conditions need to be met for electron matrices to form. The first condition is that the electrons in each orbit level meet the condition of small energy difference between electrons. The second condition is the electron density is great enough to establish the matrix.

The unique initiating method of spiraling the beam separates the electrons into concentric orbit levels, because the force of rotation is balanced by the magnetic field. An electron structure can exist where the energy between neighbors is sufficiently close. The energy differences between neighbors is estimated as follows:

The spiraling effect caused by the initiating circular magnetic field causes all the electrons to seek monoenergetic orbits. The force of rotation $F=mV^2/r$ separates the electrons based on their energy level, with higher energy electrons residing in higher orbit levels than lower energy electrons. During initiation, the thin, hollow electron shell of the toroid starts out as a mass of electrons. The longer they spiral, more "rotational filtering" occurs, and the closer energy levels become between neighboring electrons.

The energy condition is that energy level differences of neighboring electrons be less than the thermal energy. This is estimated to be 300K for the electrons in the EST. At this energy level, the distance between shells is:

$$\frac{mV^2(D)}{r} = 4.37 * 10^{21} \text{ Joules}$$

where:
r is the orbit radius, and
D is the distance between concentric monoenergetic orbits.

When r=0.01 meter and V=4.6*10$^7$ (24,000 volts), then D=2.26*10$^{-8}$ meters. To compare this to coupling reported by Gilbert (Gilbert, S. L. Bollinger, J. J., and Wineland, D. J. "Shell-Structure Phase of Magnetically Confined Strongly Coupled Plasmas," Physical Review Letters, Vol. 60, No. 20 (May 16, 1988)), a correction factor is needed to correlate electron mass to ion mass. Dividing D by electron mass and multiplying by ion mass:

$$D = (2.26*10^{-8})(1.67*10^{-27})/(9.11*10^{31}) = 41.4*10^{-6} \text{ meters.}$$

From Gilbert, the summary states the ion shells are equally spaced at 40 $\mu$m, or 40*10$^{-6}$ meters. This is very close to the EST requirement, and demonstrates the EST will be able to establish the condition that neighboring electrons will be close enough in energy to form the electron matrix.

The electron density in a sheet is very high because the thickness of the sheet is low. Using the sinusoidal motion theory of electrons in the outer EST shell, the density can be calculated. This is done as follows:

$D_e$=electron distance=$(0.5)h/m_e$ V=half de Broglie wavelength=$8.88*10^{-11}$ m at 100 VDC electron energy.
$D_0 = 30\ D_e$
$A_e$=Area per electron=$2.29*10^{-19}\ m^2$
$T_s$=Electron shell thickness=$10*10^{-10}$ m.
$V_e$=Volume per electron=$A_e \times T_s = 2.29*10^{-29}\ m^3$
$n_b$=Density of the electron shell=$4.4*10^{28}$ electrons per cubic meter, or $4.4*10^{22}$ electrons per cubic centimeter.

Note that the values of $D_e$, $D_0$ and $T_s$ are estimates based on the sinusoidal motion theory of electrons in an orbit level.

The coupling factors ($\Gamma$) needed for coupling into an electron matrix is approximately 200. Using the density and energy differences from above, the coupling factor is calculated as:

$$\Gamma = 317 \text{ where T=300, and } n_b = 4.4*10^{28} \text{ electrons/m}^3$$

This high coupling factor indicates a matrix can form in the surface of the EST. This result confirms that strong coupling occurs in each orbit level of the EST.

Practical Applications

The Electron Spiral Toroid can be adapted for use in various energy storage and recovery applications. A system in accordance with the invention can be used whenever lightweight or high power is required. Such a system has a volume of about 63 liters and a mass of 1.4 Kg (including housing). The following table compares a preferred EST system with lead acid and lithium polymer battery technologies.

|  | LEAD ACID | LITHIUM POLYMER | EST |
|---|---|---|---|
| SPECIFIC ENERGY (WATT-HRS/KILOGRAM) | 25 | 200 | 28,000 |
| PEAK POWER (WATTS/KG) | 150 | 400 | >100,000 |
| RECHARGE TIME (HRS) | 6–8 | 3–6 | <0.1 |
| LIFE (YRS) | 3–5 | 10 | >10 |
| ENERGY DENSITY (WATT-HR PER LITER) | 80 | 300 | 1274 |
| COLD WEATHER DERATING | UP TO 90% | UP TO 90% | NONE |
| ENVIRONMENTAL | HAZARD | HAZARD | NONE |

In particular, a system in accordance with the invention is well adapted for use in electric-powered vehicles, heating systems and military systems. The types of vehicles operable by an EST system include automobiles, trucks, buses, trains, aircraft (including helicopters) and spacecraft. The low weight of the system also makes it appealing as a portable power pack, carried or worn by a person.

In a preferred embodiment of the invention, an electric vehicle uses an EST battery as a stored energy source. The EST battery has substantial potential performance advantages over chemical batteries. The EST electric vehicle has substantial performance advantages over internal combustion engines.

Figure 27:
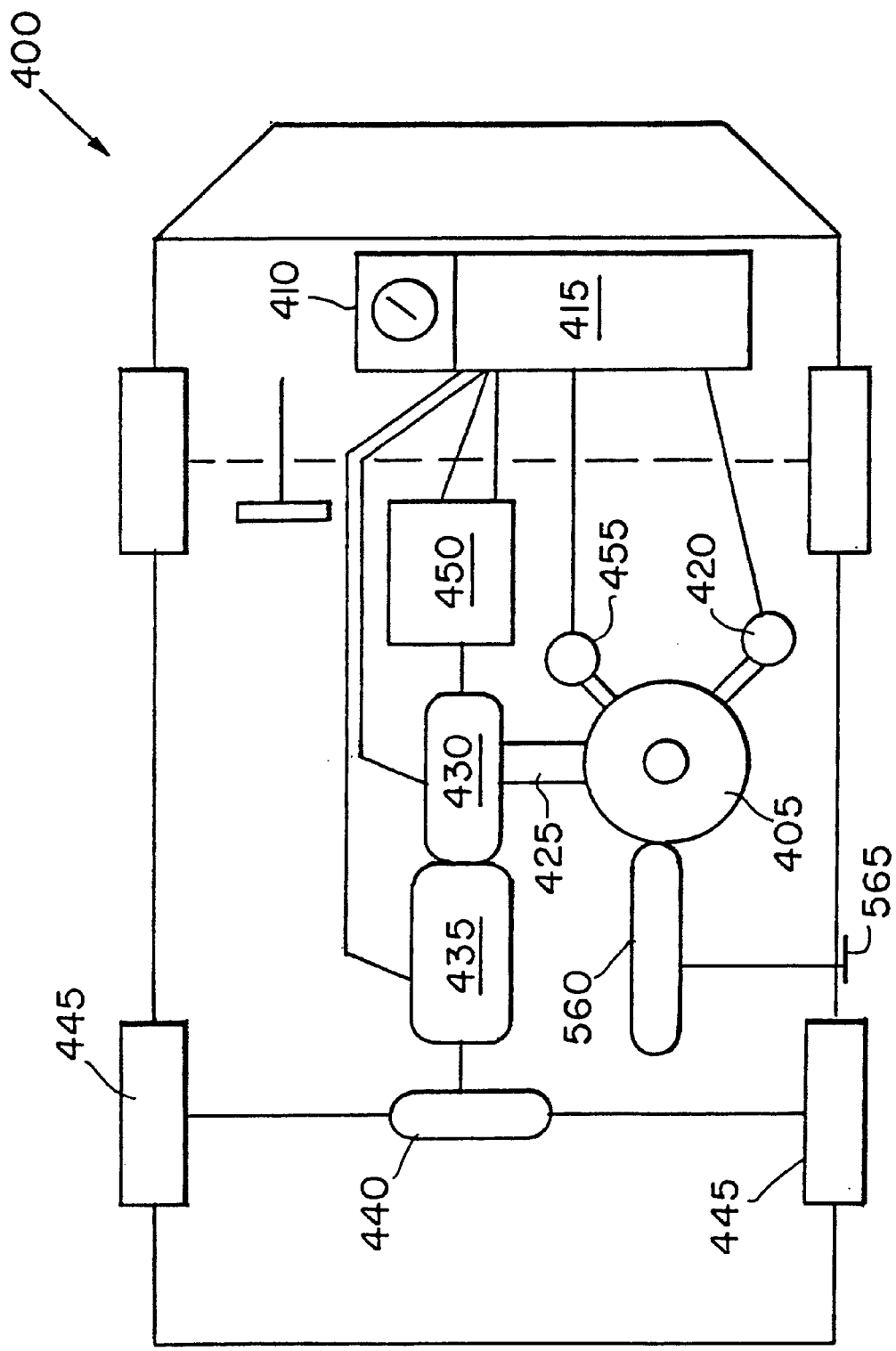
FIG. 27 is a schematic diagram of an electric vehicle in accordance with the invention.

FIG. 27 is a schematic diagram of an EST electric vehicle 400 in accordance with the invention. The EST battery is housed in a vacuum housing 405 of disc form. Total energy stored is about 40 kilowatt hours nominally, but can be made greater or less depending on the application.

When an operator turns on an ON/OFF switch 410, a control system 415 activates a power extraction unit 420. In one embodiment, the power extraction unit 420 can use hot gas to extract the energy. In the hot gas version, gas is inserted into the EST battery, where it is heated. The heated gas is sent through an energy duct 425, to a generator 430. The generator 430 converts the hot gas to power, suitable to power a motor 435. The motor 435 in turn drives planetary gears 440, which provide power to the wheels 445. The gas can be air, or nitrogen, or any similar gas.

To deactivate the EST power, the operator deactivates the EST battery through the ON/OFF switch 410, disabling the power extraction unit 420. The generator 430 can also power a small electric storage battery 450 to allow the operator to run accessories when the EST battery is deactivated. A vacuum pump and sensor unit 455 is provided to maintain the EST battery vacuum atmosphere level as required.

In a second embodiment, an electron power extraction unit extracts packets of electrons from the EST itself, as described in detail above. The generator 430 can then use the electron packets to generate power.

Power can be added to recharge the EST, using a recharger 460. The recharger 460 obtains power from an external power connect 465. The operator will typically connect the external power connect 465 to an electrical outlet when the vehicle is not in use. The recharger 460 can be a microwave device for recharging the EST, as indicated above.

Figure 28:
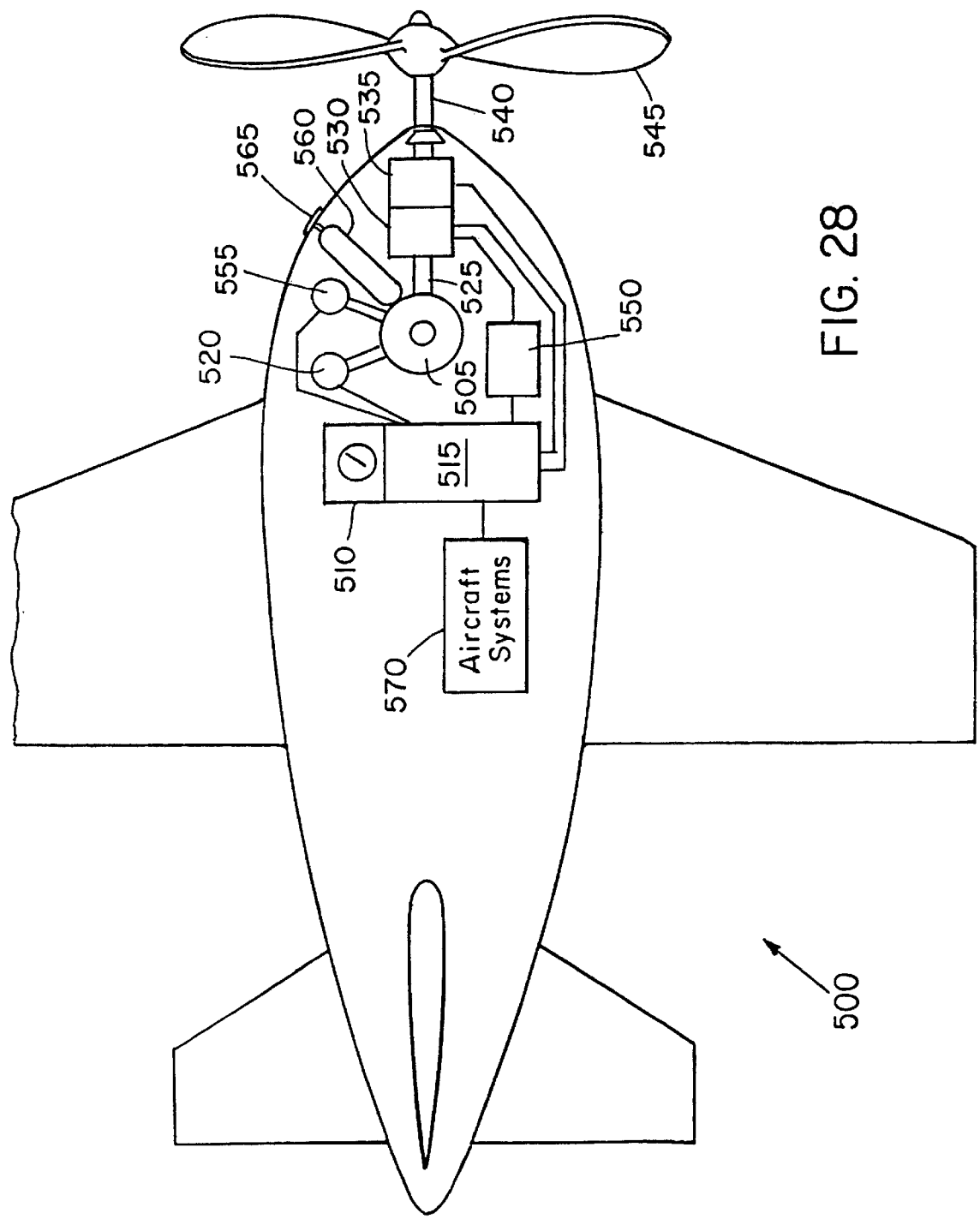
FIG. 28 is a schematic diagram of an electric aircraft in accordance with the invention.

FIG. 28 is a schematic diagram of an electric aircraft 500 in accordance with the invention. As with the electric vehicle 400 of FIG. 27, the EST battery is housed in a vacuum housing 505 of disc form. When a pilot turns on an ON/OFF switch 510, a control system 515 activates a power extraction unit 520. The power extraction unit 520 can use hot gas to extract the energy or can extract packets of electrons, as described in detail above.

In the hot gas version, gas such as air or nitrogen is inserted into the EST battery, where it is heated. The heated gas is sent through an energy duct 525, to a generator 530. The generator 530 converts the hot gas to power, suitable to power a motor 535 and aircraft avionics 570. The motor 535 in turn drives a propeller shaft 540, which provide power to the propeller 545.

The generator 530 can also power a small electric storage battery 550 to allow the pilot to run accessories when the EST battery is deactivated. A vacuum pump and sensor unit 555 is provided to maintain the EST battery vacuum atmosphere level as required.

Power can also be added to recharge the EST, using a recharger 560. The recharger 560 obtains power from an external power connect 565 coupled to an electrical outlet. The recharger 560 can be a microwave device for recharging the EST, as indicated above.

Figure 29:
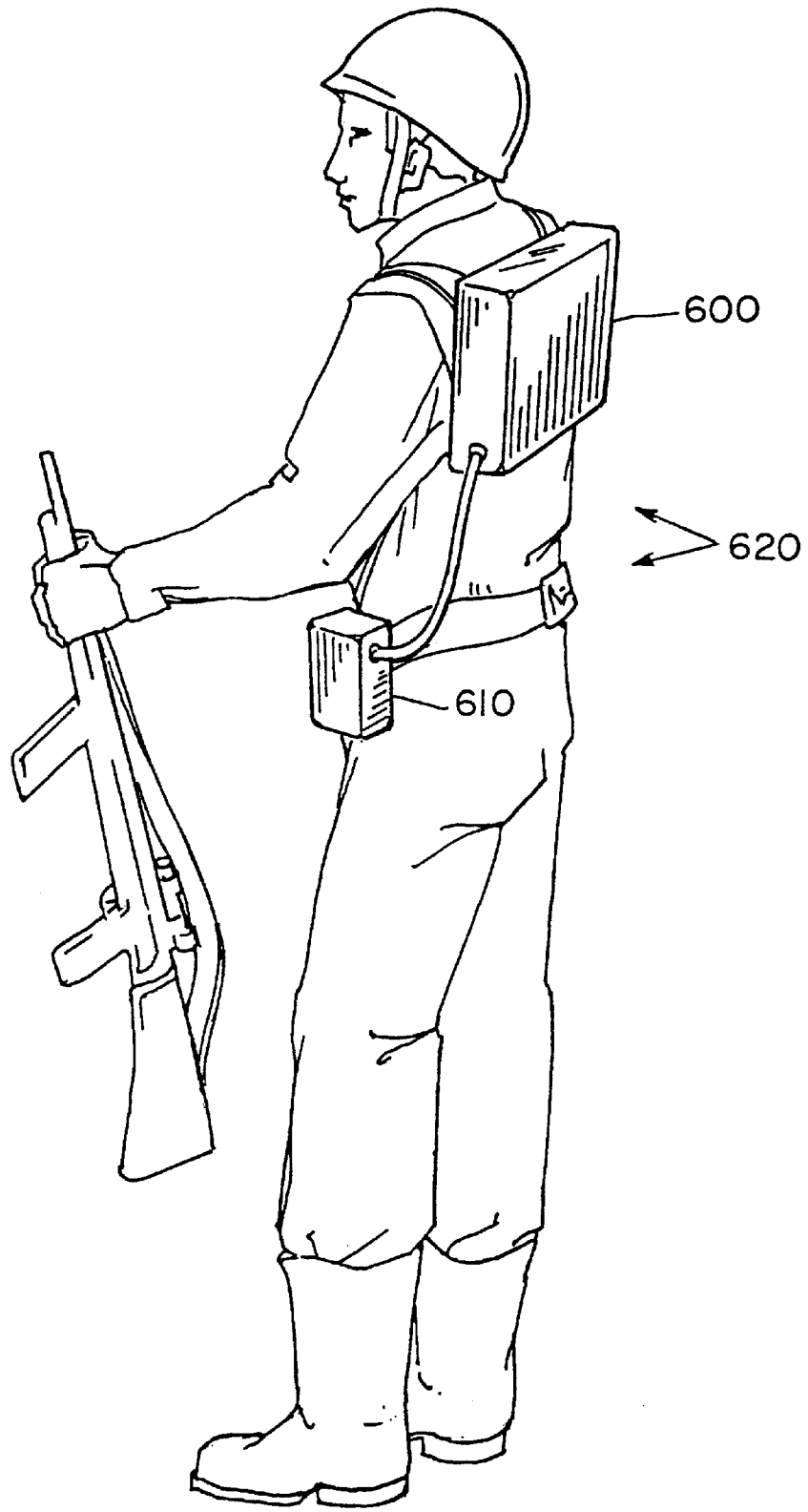
FIG. 29 is a schematic diagram of a portable power supply in accordance with the invention.

FIG. 29 is a schematic diagram of a portable power supply in accordance with the invention. A rechargable EST battery such as described above is housed within a power pack 600. Because the EST battery is a light weight and physically compact device, the power pack 600 can be worn by a wearer, as illustrated. The power pack 600 can be connected to external electronic equipment 610, such as communication and computer packages.

Equivalents

The preceding description is particular to the preferred embodiments and may be changed or modified without substantially changing the nature of the invention. While the invention has been particularly shown and described with reference to preferred embodiments thereof, it will be understood by those skilled in the art that various changes in form and details may be made therein without departing from the spirit and scope of the invention as defined by the appended claims.

The invention claimed is:

1. An energy storage device comprising:

an energy storage housing;

a plurality of single charged particles that are orbiting in a toroidal orbital layer within the storage housing; and a charge neutralizer symmetrically positioned relative to the toroidal orbital layer such that an electric charge of the neutralizer neutralizes an electric charge of the charged particles.

2. The device of claim 1 wherein the orbital layer defines a spiral toroid.

3. The device of claim 1 wherein the particles are electrons.

4. The device of claim 1 wherein the particles in the orbital layer are coupled together to form a matrix.

5. The device of claim 4 wherein the particles are at a temperature substantially above absolute zero.

6. The device of claim 1 wherein the particles are arranged on a plurality of orbital layers, the particles in each orbital layer having substantially the same energy.

7. The device of claim 1 wherein the charge neutralizer is a charge accumulator symmetrically arranged relative to the particle orbits.

8. The device of claim 1 wherein the charge neutralizer is an image charge formed on metal.

9. The device of claim 1 wherein the charge neutralizer is an ionized gas.

10. The device of claim 1 wherein the charge neutralizer is spatially separated from the orbital layer.

11. The energy storage device of claim 1 further comprising a recharger for adding energy to the particles.

12. The energy storage device of claim 11 wherein the recharger includes a microwave generator.

13. A method of storing energy comprising the steps of:

providing an energy storage housing;

forming a plurality of single charged particles within the storage housing;

arranging the particles in a toroidal orbital layer; and positioning a charge neutralizer symmetrically relative to the toroidal orbital layer.

14. The method of claim 13 further comprising the step of providing a recharger for adding energy to the particles.

15. The method of claim 14 wherein the recharger includes a microwave generator.

16. The method of claim 13 wherein the step of arranging the particles comprises arranging the particles in a plurality of orbital layers, the particles in each orbital layer having substantially the same energy.

17. The method of claim 13 further comprising the step of coupling the particles in the orbital layer together to form a closed surface.

\* \* \* \* \*